(12) United States Patent
Forutanpour

(10) Patent No.: US 9,597,565 B2
(45) Date of Patent: Mar. 21, 2017

(54) MULTI-SPORT BALL

(71) Applicant: AryaBall, LLC, Carlsbad, CA (US)

(72) Inventor: Babak Forutanpour, Carlsbad, CA (US)

(*) Notice: Subject to any disclaimer, the term of this patent is extended or adjusted under 35 U.S.C. 154(b) by 0 days.

(21) Appl. No.: 14/173,674

(22) Filed: Feb. 5, 2014

(65) Prior Publication Data

US 2014/0221136 A1    Aug. 7, 2014

Related U.S. Application Data

(60) Provisional application No. 61/761,655, filed on Feb. 6, 2013, provisional application No. 61/762,963, filed
(Continued)

(51) Int. Cl.
*A63B 43/00* (2006.01)
*A63B 59/00* (2015.01)
(Continued)

(52) U.S. Cl.
CPC .............. *A63B 59/00* (2013.01); *A45C 11/20* (2013.01); *A63B 43/00* (2013.01); *A63B 47/00* (2013.01); *A63B 71/0036* (2013.01); *A63B 71/06* (2013.01); *A63B 71/0616* (2013.01); *A63B 15/00* (2013.01); *A63B 43/002* (2013.01); *A63B 53/00* (2013.01); *A63B 69/0002* (2013.01); *A63B 69/0053* (2013.01); *A63B 71/0045* (2013.01); *A63B 2069/0008* (2013.01); *A63B 2071/068* (2013.01); *A63B 2071/0625* (2013.01); *A63B 2209/08* (2013.01); *A63B 2209/10* (2013.01); *A63B 2225/15* (2013.01); *A63B 2225/20* (2013.01); *A63B 2225/50* (2013.01); *A63B 2225/62* (2013.01); *A63B 2225/685* (2013.01); *A63B 2225/687* (2013.01); *H04M 1/7253* (2013.01); *H04M 1/72522* (2013.01)

(58) Field of Classification Search
CPC ....... A63B 43/00; A63B 43/002; A63B 39/00; A63B 2225/685; A63B 2225/687; A63B 2209/10; A63B 71/0036
See application file for complete search history.

(56) References Cited

U.S. PATENT DOCUMENTS 1,258,464 A * 3/1918 Riley .................. A63H 3/52
                                                      446/254
2,499,483 A * 3/1950 Foy .................... A63B 43/00
                                                      446/219
(Continued)

OTHER PUBLICATIONS

International Search Report issued in PCT/US14/14953 dated Aug. 11, 2014.

*Primary Examiner* — Steven Wong
(74) *Attorney, Agent, or Firm* — Donn K. Harms

(57) ABSTRACT

A multi-sport ball is provided having an outer ball and an intermediate ball. The outer ball includes an outer ball first side and an outer ball second side, wherein the outer ball forms an intermediate compartment therein. The intermediate ball has a different shape than the outer ball and the intermediate compartment is configured to receive the intermediate ball. The outer ball first side and the outer ball second side each having a mating face, wherein the outer ball first side and the outer ball second side are configured to be separated at the mating faces.

15 Claims, 40 Drawing Sheets

Related U.S. Application Data on Feb. 11, 2013, provisional application No. 61/827,010, filed on May 24, 2013, provisional application No. 61/830,131, filed on Jun. 2, 2013.

(51) Int. Cl.

| | | |
|---|---|---|
| *A63B 71/06* | (2006.01) | |
| *A45C 11/20* | (2006.01) | |
| *A63B 47/00* | (2006.01) | |
| *A63B 69/00* | (2006.01) | |
| *A63B 15/00* | (2006.01) | |
| *A63B 71/00* | (2006.01) | |
| *H04M 1/725* | (2006.01) | |
| *A63B 53/00* | (2015.01) | |

(56) References Cited

U.S. PATENT DOCUMENTS

| | | | |
|---|---|---|---|
| 2,533,904 A | 12/1950 | Urban | |
| 4,179,973 A * | 12/1979 | White | G10D 13/06 446/419 |
| 4,300,767 A * | 11/1981 | Reed | A63B 39/00 473/594 |
| 4,645,471 A | 2/1987 | Herring et al. | |
| 5,078,408 A * | 1/1992 | Myers | A63B 43/002 473/569 |
| 5,131,665 A * | 7/1992 | Myers | A63B 43/002 473/569 |
| 5,219,162 A * | 6/1993 | Orbanes | A63B 43/00 446/409 |
| 5,388,825 A | 2/1995 | Myers et al. | |
| 6,030,303 A * | 2/2000 | Wallace, Jr. | A63B 43/007 473/575 |
| 6,575,855 B1 * | 6/2003 | Buzak | A63B 43/06 273/DIG. 8 |
| 6,666,782 B1 * | 12/2003 | Wu | A63H 33/22 446/242 |
| 8,196,550 B2 * | 6/2012 | Levin | A01K 15/00 119/707 |
| 2005/0176532 A1* | 8/2005 | Thorington | A63B 43/04 473/595 |
| 2006/0079355 A1* | 4/2006 | May | A63B 43/00 473/594 |
| 2008/0220916 A1* | 9/2008 | Montgomery | A63B 43/00 473/604 |
| 2014/0309063 A1* | 10/2014 | Molina | G10H 1/26 473/570 |

\* cited by examiner

How many points is a score worth in each game?
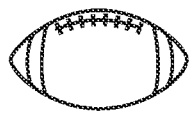 3 POINTS
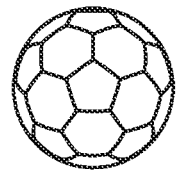 2 POINTS
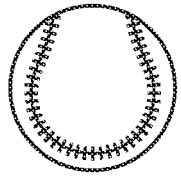 4 POINTS
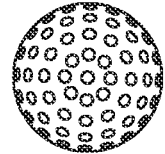 1 POINT
Split games longer than
10 MIN
FIG. 36

MULTI-SPORT BALL

CROSS-REFERENCE TO RELATED APPLICATIONS

This application claims priority to U.S. Provisional Application No. 61/761,655, filed on Feb. 6, 2013, U.S. Provisional Application No. 61/762,963, filed on Feb. 11, 2013, U.S. Provisional Application No. 61/827,010, filed on May 24, 2013, and U.S. Provisional Application No. 61/830,131, filed on Jun. 2, 2013, the disclosures of which are incorporated herein by reference in their entireties.

TECHNICAL FIELD

The present invention relates generally to sporting equipment, and, in particular, to storage within sporting equipment for sporting equipment of multiple sports.

BACKGROUND

Different types of sporting equipment are well known to those of ordinary skill in the art. As examples of popular sports in the United States, the sport of soccer requires a soccer ball, the sport of football requires a football, the sport of baseball requires a baseball and a bat, the sport of golf requires a golf ball and a golf club. Other sports may include rugby, cricket, croquet, and others which all may require unique equipment.

Each sport or game requires different types of equipment and/or balls, as is well known to those of ordinary skill in the art. For example, the shape of a soccer ball is different than the shape of a football. As another example, the size of a soccer ball is larger than the size of a baseball or golf ball. A ball for one sport may not be suitable as a ball for another sport.

Similarly, the types of bats or clubs required for each sport may be different. For example, a baseball bat is a different shape than a golf club. Because of the different types of equipment and balls required for different sports, a person that desires to play multiple sports or games must also have the different respective sporting equipment and balls for each of the desired sports. As such, in order to satisfy the desire to play multiple sports, large containers or bags are used to store and transport the different types of equipment and balls. Accordingly, there remains a need for a space efficient and convenient way to store equipment and balls for multiple sports.

SUMMARY

According to an embodiment, a multi-sport ball comprises an outer ball having an outer ball first side and an outer ball second side, wherein the outer ball forms an intermediate compartment therein; an intermediate ball having a different shape than the outer ball, wherein the intermediate compartment is configured to receive the intermediate ball; the outer ball first side and the outer ball second side each having a mating face, wherein the outer ball first side and the outer ball second side are configured to be separated at the mating faces.

According to an embodiment, a system comprises a memory; and a processor coupled to the memory, the processor being configured to: collect data from a user device regarding a plurality of desired games; allocate time to play each of the plurality of desired games; alert a user for a start time of each of the plurality of desired games; and provide a time for an allocated time of play for each of the desired games.

According to an embodiment, a computer readable storage medium comprises instructions that if executed enables a computing system to: collect data from a user device regarding a plurality of desired games; determine an allocation of time to play the plurality of desired games; alert a user for a start time of each of the plurality of desired games; and provide a time for an allocated time of play for each of the desired games.

According to an embodiment, a method of determining game play comprises providing a plurality of game options; determining a desired quantity of game play by the user device; determining a proportion of total game play duration for each of the plurality of games by a computing device by the user device, providing a timer for each of the plurality of games by the user device, wherein the timer is configured based on the proportion of total game play duration determined for each of the plurality of games.

According to an embodiment, a multi-sport apparatus comprises a handle portion, a head portion having a hingedly attached hinge portion moveable between a first configuration and a second configuration, wherein in the first configuration a longitudinal axis of the hinge portion extends parallel to a longitudinal axis of the head portion, wherein in the second configuration the longitudinal axis of the hinge portion extends at an angle to the longitudinal axis of the head portion.

Further aspects, objectives, and advantages, as well as the structure and function of embodiments, will become apparent from a consideration of the description, drawings, and examples.

BRIEF DESCRIPTION OF THE DRAWINGS

The features and advantages of the invention will be apparent from the following drawings wherein like reference numbers generally indicate identical, functionally similar, and/or structurally similar elements.

FIG. 36 is an embodiment of a point selection screen;

DETAILED DESCRIPTION

Embodiments of the invention are discussed in detail below. In describing embodiments, specific terminology is employed for the sake of clarity. However, the invention is not intended to be limited to the specific terminology so selected. For example, although specific types of balls and sporting equipment are used in the following embodiments, it is foreseen that other types of sporting equipment and balls may be adapted for use in the various embodiments. A person skilled in the relevant art will recognize that other equivalent parts can be employed and other methods developed without departing from the spirit and scope of the invention.

Multi-Sport Ball

Figure 1:
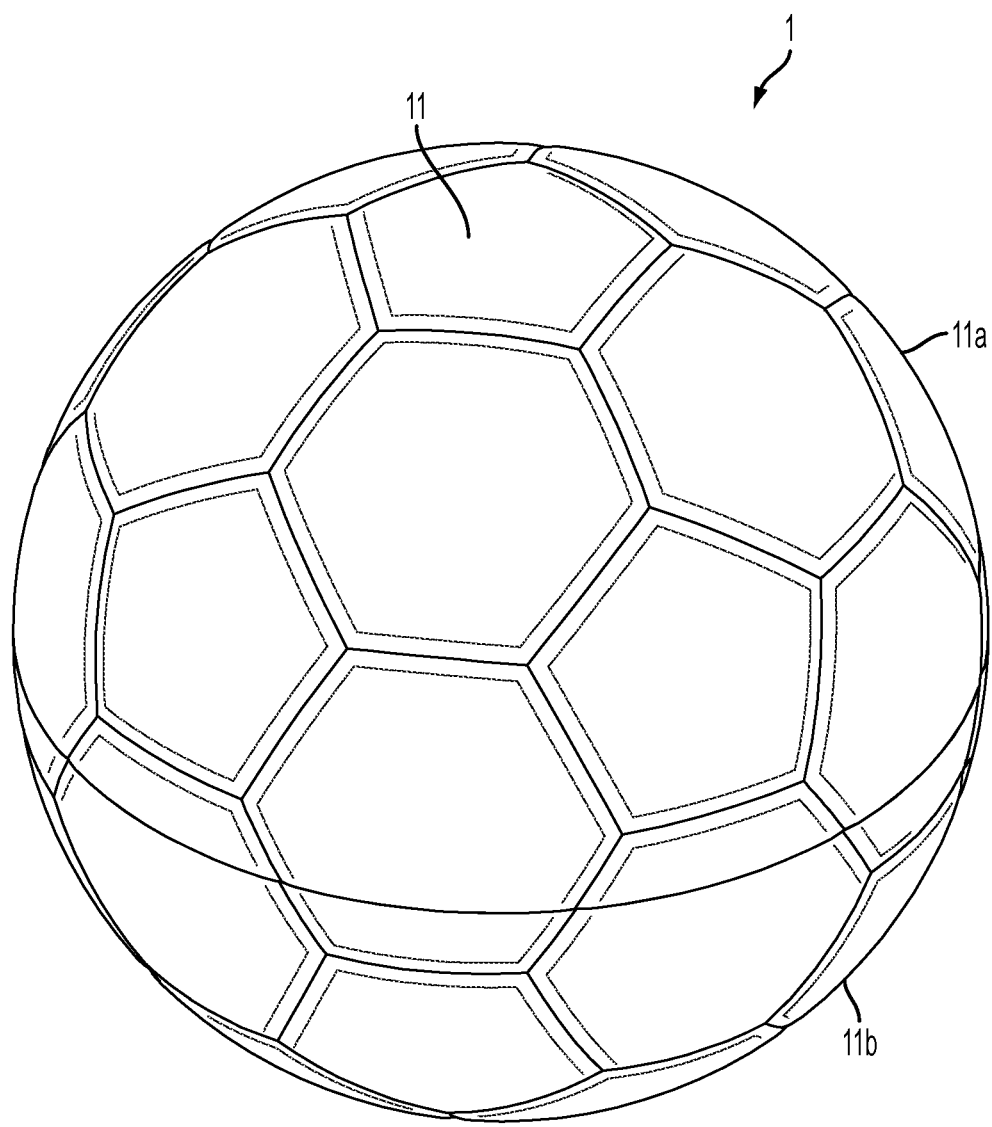
FIG. 1 is an embodiment of a multi-sport ball.
Figure 2:
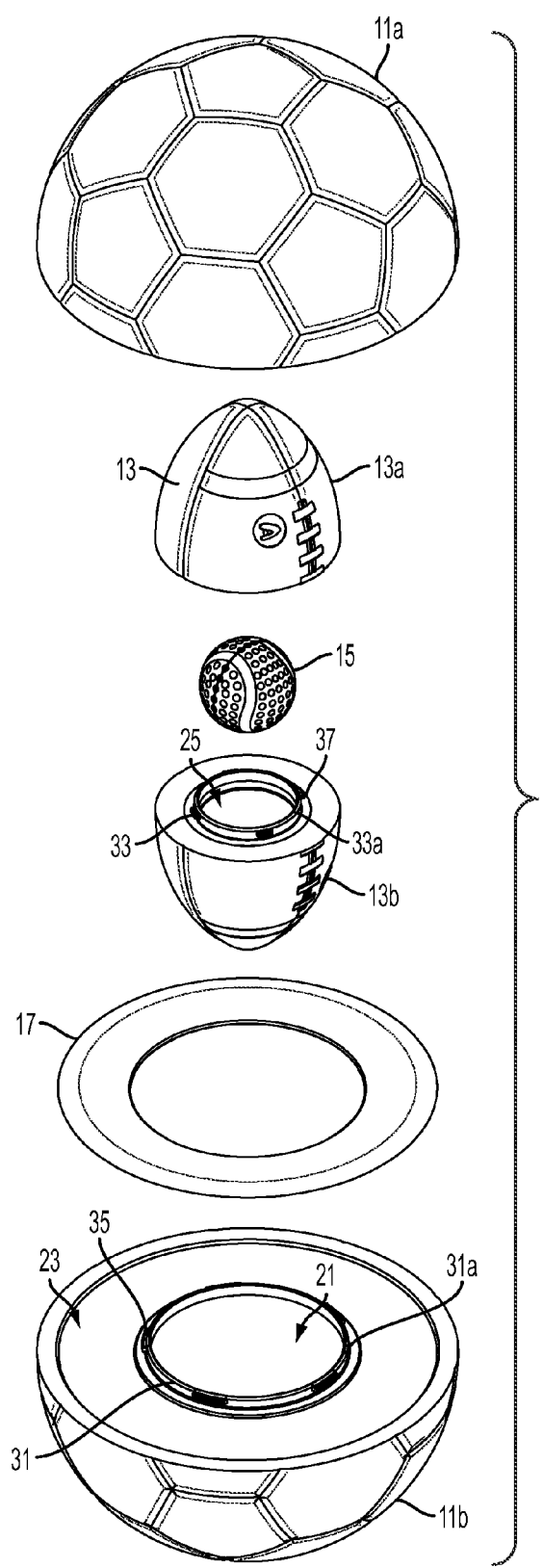
FIG. 2 is an exploded view of the multi-sport ball of FIG. 1.

Referring now to FIGS. 1-19, various embodiments of a multi-sport ball 1 are illustrated. Referring now to FIGS. 1 and 2, a multi-sport ball 1 may generally comprise an outer ball 11, an intermediate ball 13, an inner ball 15, and a disc 17. The outer ball 11, intermediate ball 13, inner ball 15, and disc 17 may be respectively used for different sports or games such as, for example, but not limited to golf, baseball, croquet, cricket, football, rugby, soccer, basketball, ultimate, and dodge ball. It is foreseen that other types of balls may be used with the various embodiments. According to an embodiment, the inner ball 15 may be, for example, a golf ball or a baseball, the intermediate ball 13 may be, for example, a football or a rugby ball, the outer ball 11 may be, for example, a soccer ball or a basketball, and the disc 17 may be, for example, a flying disc. The inner ball 15 may be a hybrid ball such as, for example, a ball having dimples on a surface thereon (such as on a golf ball), as well as real or painted red stitching (such as on a baseball). According to the embodiment, the inner ball 15 and/or the outer ball 11 may be substantially spherical whereas the intermediate ball 13 may be oblong or another non-spherical shape. However, it is foreseen that the intermediate ball 13 may also be spherical. Moreover, according to other embodiments, the multi-sport ball 1 may be provided without any one or more of the inner ball 15, the intermediate ball 13, the outer ball 11, and/or the disc 17. For example, the multi-sport ball 1 may be provided with only the outer ball 11 and the intermediate ball 13. As another example, the multi-sport ball 1 may be provided with only the outer ball 11 and the inner ball 15.

The outer ball 11 may be separated into a first hemisphere or side 11a and a second hemisphere or side 11b both having an intermediate compartment 21 formed therein. At least one or both hemispheres or sides 11a or 11b may further include a circumferential compartment 23. Similarly, the intermediate ball 13 may be separated into a first hemisphere or side 13a and a second hemisphere or side 13b both having an inner compartment 25 formed therein. According to an embodiment, at least one or both hemispheres or sides 13a and 13b may further include a circumferential compartment similar to the circumferential compartment 23 of the hemispheres or sides 11a or 11b.

In an assembled configuration, as illustrated at FIG. 1, for example, both of the intermediate ball 13 and inner ball 15 may be contained within the outer ball 11. For example, the inner ball 15 may be contained within or received by the inner compartment 25 of the intermediate ball hemispheres or sides 13a and 13b. Similarly, the intermediate ball 13 may be contained within or received by the intermediate compartment 21 of the outer ball hemispheres or sides 11a and 11b. Further, the disc 17 may be contained within or received by the circumferential compartment 23 of one or both of the outer ball hemispheres or sides 11a and 11b. In such a manner, for example, three balls and a disc may comprise a single multi-sport ball 1. It is foreseen that that the inner compartment 25 may be formed or shaped to receive other items instead of or in addition to the inner ball 15, such as, for example, a can, a beer or soda can, a wallet, a key or set of keys on a keychain, food, other item of suitable size to fit in the inner compartment 24. Similarly, it is foreseen that the intermediate compartment 21 may be formed or shaped to receive such other items instead of or in addition to the intermediate ball 13. Further, it is foreseen that the outer ball 11 and/or intermediate ball 13 may be formed from a thermal insulating material. For example, the thermal insulating material may keep a cold or hot food item at a desired temperature within the multi-sport ball 1.

According to an embodiment, the outer ball 11, the intermediate ball 13, and the inner ball 15 may be formed from, for example, but not limited to, a foam, a plastic, an insulating material, or a rubber. Additionally, the walls of any of the outer ball 11, the intermediate ball 13, and/or the inner ball 15 may have or may be an inflatable bladder. For example, each of the outer ball 11, the intermediate ball 13, and the inner ball 15 may be made of a soft, spongy, or compressible material. According to an embodiment, the foam material may be covered with a skin, Teflon, rubber, or other material in order to prevent damage to the foam material. It is foreseen, for example, that the inner ball 15 may be formed from, for example, but not limited to, a plastic, wood, metal, or other rigid or semi-rigid material, as known to one of ordinary skill in the art. Similarly, the outer ball 11 may be formed from, for example, but not limited to, a leather, rubber, or other rigid or semi-rigid material as known to one of ordinary skill in the art. Various combinations of materials may be used for each of the outer ball 11, the intermediate ball 13, and the inner ball 15.

Referring now to FIGS. 3-6, the multi-sport ball 1 may further comprise an intermediate chamber 31 and an inner chamber 33. The intermediate compartment 21 of the outer ball 11 may have the intermediate chamber 31 therein. For example, the intermediate chamber 31 may at least partially, fully, or substantially line the intermediate compartment 21 of each of the hemispheres or sides 11*a* and 11*b* of the outer ball 11 such that the intermediate chamber 31 is divided between sides or hemispheres 31*a* and 31*b*. The inner compartment 25 of the intermediate ball 13 may have the inner chamber 33 therein. For example, the inner chamber 33 may substantially line the inner compartment 25 of each of the hemispheres or sides 13*a* and 13*b* of the intermediate ball 13 such that the inner chamber 33 is divided between sides or hemispheres 33*a* and 33*b*.

The intermediate chamber 31 and inner chamber 33 may be formed from, for example, but not limited to, a plastic, a rubber, a metal, or other rigid or semi-rigid material, as known to one of ordinary skill in the art. According to an embodiment, the material of the intermediate chamber 31 and the inner chamber 33 may be relatively more rigid than the material of the outer ball 11 and/or the intermediate ball 13.

The intermediate chamber 31 and inner chamber 33 may be attached or affixed to the intermediate compartment 21 of the outer ball 11 and the inner compartment 25 of the intermediate ball 13, respectively. For example, the chambers 31 and 33 may be attached or affixed to the compartments 21 and 25, respectively, with an epoxy, glue, or other adhesive, as known to one of ordinary skill in the art. Alternatively or in combination with an adhesive, the chambers 31, 33 may be attached or affixed to the compartments 21 and 25, respectively, with clips, screws, and/or other fastener, as known to one of ordinary skill in the art.

Figure 3:
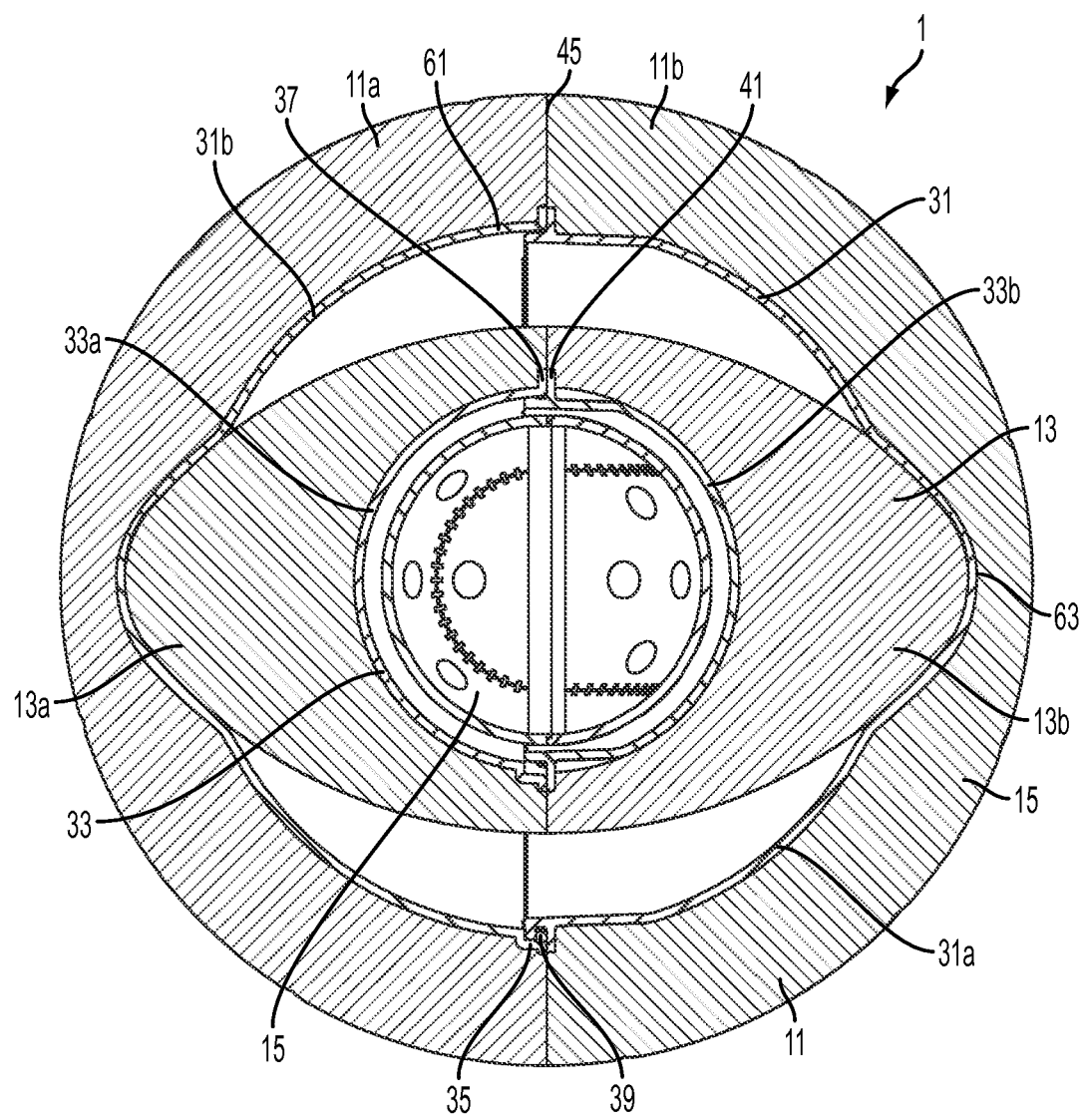
FIG. 3 is a cross-sectional view of an embodiment of a multi-sport ball.
Figure 4:
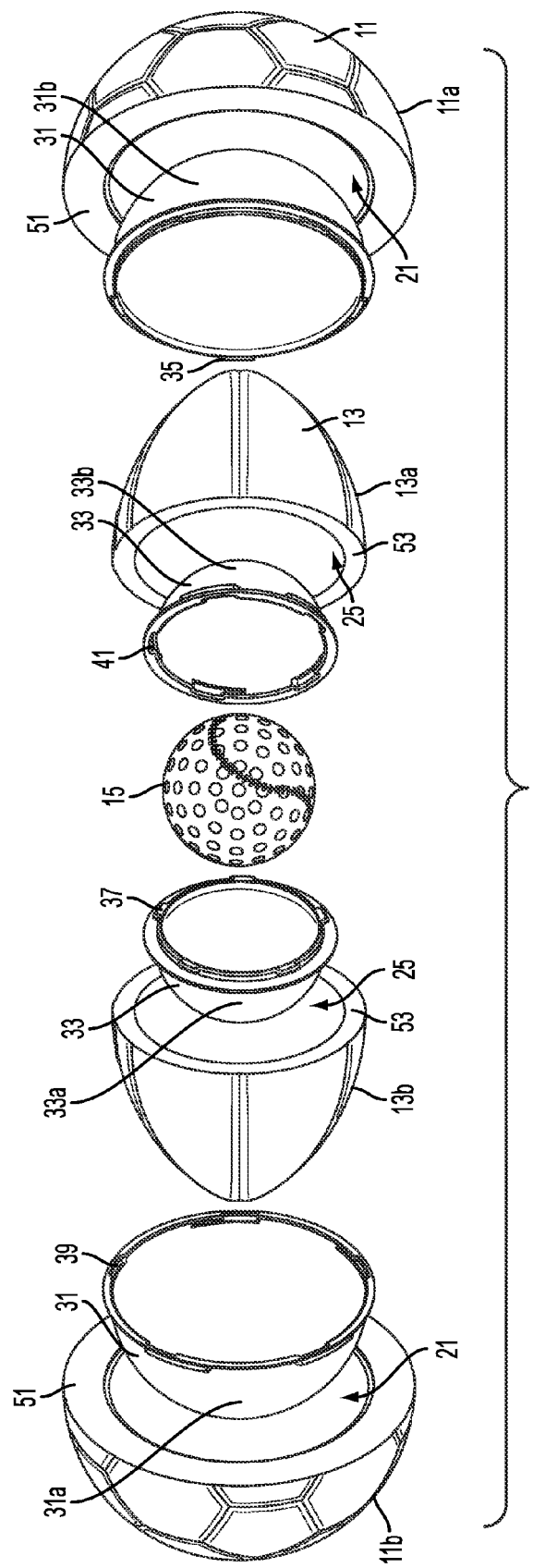
FIG. 4 is an exploded view of the multi-sport ball of FIG. 3.

The hemispheres or sides 31*a* and 31*b* of the intermediate chamber 31 may be fastened together in order to fasten together the sides or hemispheres 11*a* and 11*b* of the outer ball 11. Similarly, the hemispheres or sides 33*a* and 33*b* of the inner chamber 33 may be fastened together in order to fasten together the sides or hemispheres 13*a* and 13*b* of the intermediate ball 13. As illustrated at FIG. 2, for example, the hemispheres or sides 31*a* and 31*b* of the intermediate chamber 31 and the hemispheres or sides 33*a* and 33*b* of the inner chamber 33 may be affixed together with quarter turn fasteners. For example, the hemispheres or sides 31*a* and 33*a* of the intermediate chamber 31 and inner chamber 33, respectively, may be provided with male fasteners or connectors 35 and 37. The respective mating hemispheres or sides 31*b* and 33*b* of the intermediate chamber 31 and inner chamber 33, respectively, may be provided with female fasteners or connectors 39 and 41. Referring now to FIGS. 3 and 4, the hemispheres or sides having the male or female fasteners or connectors may be switched. For example, the hemispheres or sides 31*b* and 33*a* of the intermediate chamber 31 and inner chamber 33, respectively, may be provided with male fasteners or connectors 35 and 37. The mating hemispheres or sides 31*a* and 33*b* of the intermediate chamber 31 and inner chamber 33, respectively, may be provided with female fasteners or connectors 39 and 41.

According to an embodiment, the quarter turn fasteners or connectors may be further provided with a snap-in receptacle. For example, when the male fastener or connector 35, 37 is received in and turned relative to the female fastener or connector 39, 41, the male fastener or connector 35, 37 may flex and snap in to a receptacle in the female fastener or connector 39, 41, respectively. During use, the snap-in receptacle may prevent the hemispheres or sides 31*a*, 31*b* and 33*a*, 33*b* from unfastening or coming apart. As explained in more detail below, it is foreseen that other types of fasteners or connectors may be used to fasten or affix together the sides or hemispheres of the respective chambers and balls.

Referring again to FIG. 3, the hemispheres or sides 31*a* and 31*b* of the intermediate chamber 31 may form an equatorial or centered seam 45 dividing the hemispheres or sides 31*a* and 31*b* equally. According to other embodiments, it is foreseen that the various components of the multi-sport ball 1 may be resized and rearranged such that the seam 45 is along an axis other than the equatorial or center axis. According to other embodiments, although the hemispheres or sides 31*a* and 31*b* of the intermediate chamber 31 may form an equatorial seam 45, the outer ball 11 may be shaped so that the visible seam is not, for example, along the equator of the spherical ball or is not linear (ie zig-zag, curved, etc.).

Figure 5:
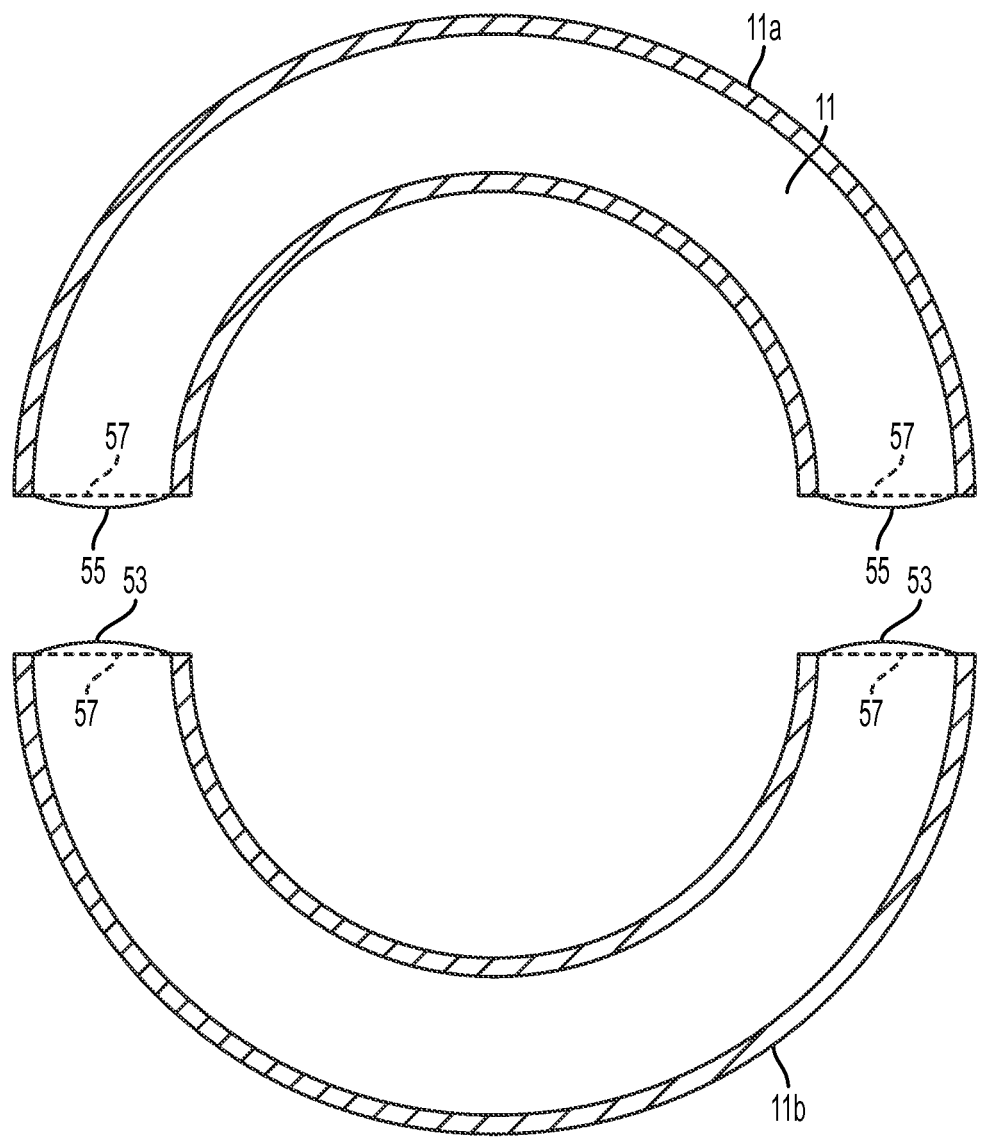
FIG. 5 is a cross-sectional view of the outer ball of FIG. 3.

Referring now to FIG. 4, the sides or hemispheres 11*a* and 11*b* of the outer ball 11 may include circumferential mating faces 51. Similarly, the sides or hemispheres 13*a* and 13*b* of the intermediate ball 13 may include circumferential mating faces 53. Referring now to FIG. 5, according to an embodiment, the circumferential mating faces 51 and 53 may be a protruding face 55 protruding outwardly from a reference plane 57 of the circumferential mating faces 51 and/or 53. The protruding face 55 is compressible upon attachment with the other of the circumferential mating faces 51 and/or 53, respectively. According to an embodiment, upon mating and compression of the circumferential mating faces, the protruding faces 55 are compressed to or approximately to the reference plane 57. For example, an embodiment of an outer ball 11 is illustrated at FIG. 5. Upon contact of the circumferential mating faces 51, the protruding faces 55 may be compressed together such that the protruding faces 55 are compressed to or approximately to the reference plane 57. Upon compression of the protruding faces 55 to or approximately to the reference plane 57, the outer ball 11 may form a substantially spherical shape.

According to an embodiment, the protruding face 55 may be a non-planar convex face. It is foreseen that the protruding face 55 may be other shapes protruding from the reference plane 57 such as, for example, but not limited to, a planar protruding portion, a curved protruding portion, or other shaped protruding portion. According to an embodiment, the protruding portion 55 may be formed integrally and of the same material as outer ball 11 or intermediate ball 13. According to another embodiment, the protruding portion 55 may be formed of a relatively more rigid material on or within the circumferential mating faces 51 and 53. For example, upon mating of the respective circumferential mating faces, the body of the outer ball 11 or intermediate ball 13 may compress to receive or further receive the protruding portion 55 therein. According to different embodiments, only one or both circumferential mating faces may have the protruding portion 55 therein or thereon.

According to an embodiment, when the outer ball 11 or intermediate ball 13 is in an assembled configuration with fasteners or connectors, as illustrated in cross-section at FIG. 3, for example, the at least one or two protruding portions 55 may urge the respective sides or hemispheres 11a, 11b and 13a, 13b linearly apart. For example, the linear force imparted by the protruding portions 55 may prevent the fasteners or connectors from unfastening or disconnecting. For example, the quarter turn fasteners or connectors described above require a rotational movement to unfasten or disconnect one side or hemisphere from the other side or hemisphere. With the outward linear urging from the mating circumferential faces having at least one protruding portion 55, increased frictional force is provided between the mating circumferential faces in order to prevent relative rotational movement thereof.

Figure 6:
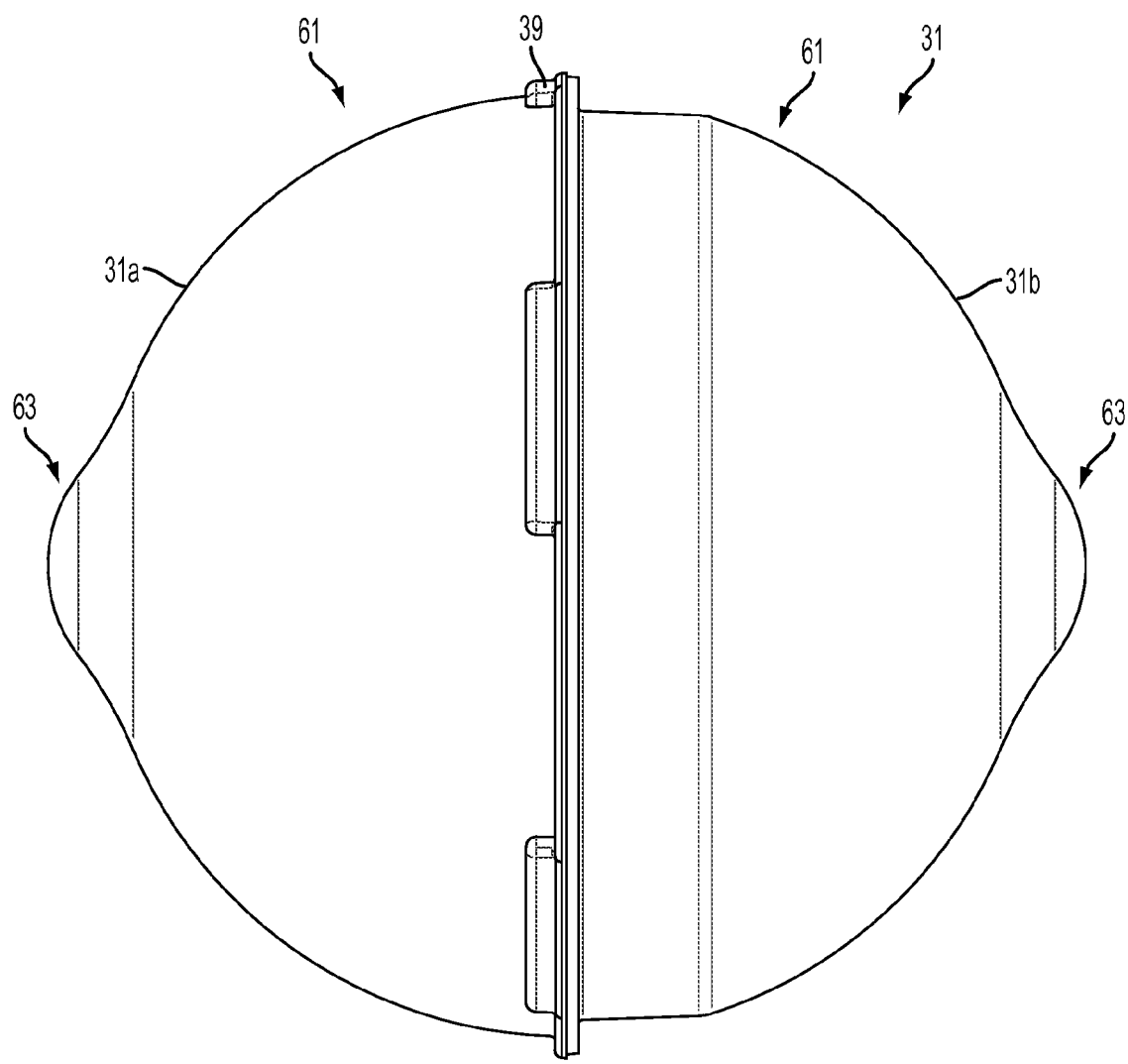
FIG. 6 is a side view of the intermediate chamber of FIG. 3.
Figure 7:
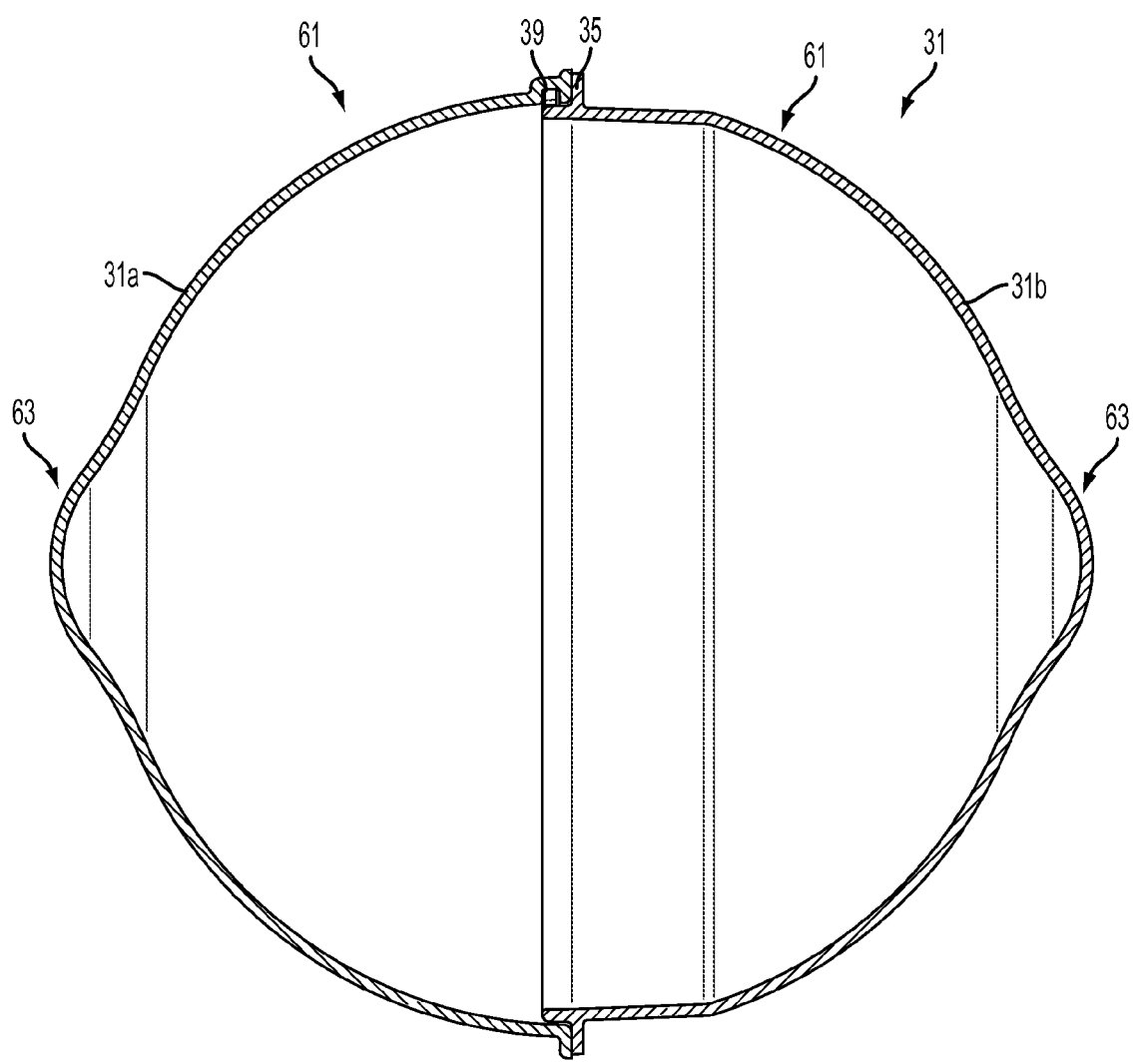
FIG. 7 is a cross-sectional view of the intermediate chamber of FIG. 6.

Referring now to FIGS. 6 and 7, an embodiment of the intermediate chamber 31 is illustrated. As explained above, the intermediate chamber 31 may include two sides or hemispheres 31a and 31b having a fastener or connector 35, 39 in order to fasten or connect the two sides or hemispheres 31a and 31b together. Each side or hemisphere 31a and 31b may further include middle portion 61 and an end, cap, or dome portion 63. According to an embodiment, the middle portion 61 may have a different shape than the end portion 63. For example, the middle portion 61 may be substantially or approximately spherical and have a first radius. The end portion 63 may be substantially or approximately spherical and have a second radius smaller than the first radius. It is foreseen that the middle portion 61 may also be a cylindrical shape, a non-symmetrical shape, or other shape. It is foreseen that the end portion 63 may be a cylindrical shape, a non-symmetrical shape, or other shape that protrudes outwardly or discontinuously from the middle portion 61. It is also foreseen that only one side or hemisphere 31a or 31b may include the end portion 63. For example, one side or hemisphere 31a or 31b may be a substantially spherical hemisphere and the other side or hemisphere 31a or 31b may have the end portion 63.

Figure 39:
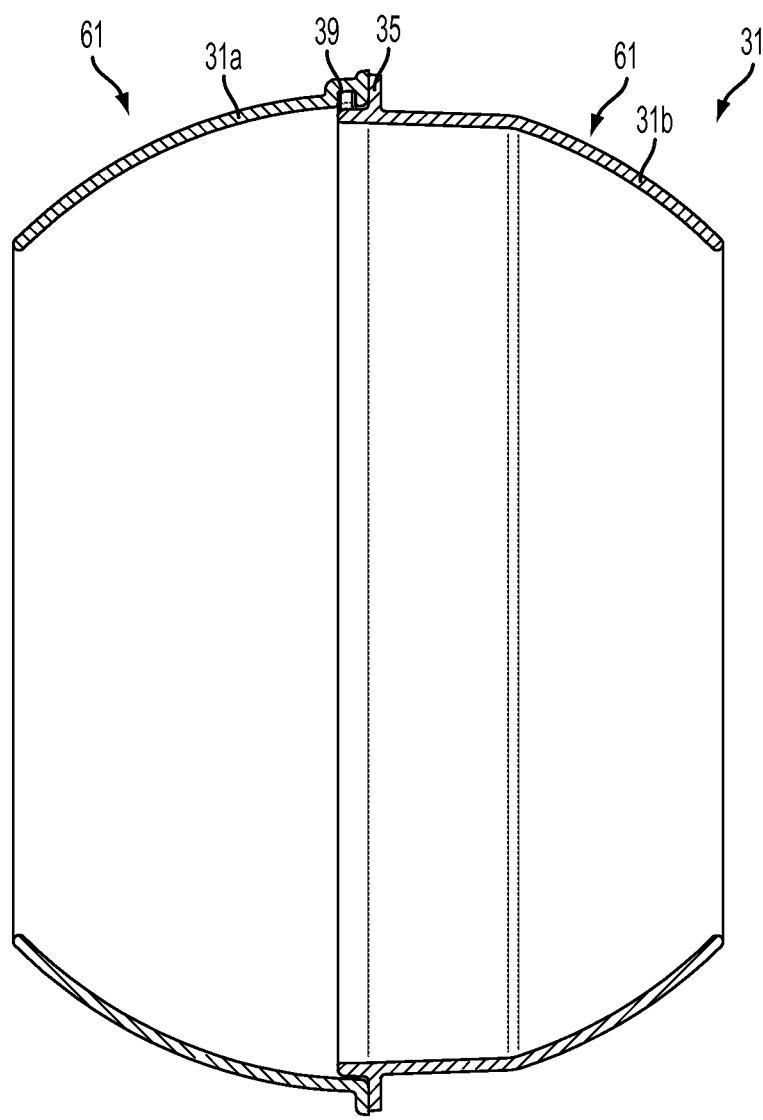
FIG. 39 is an embodiment of an intermediate chamber.

Referring now to FIG. 39, one or both sides or hemispheres 31a and 31b of the intermediate chamber 31 may include the middle portion 61 having an open end or no end portion. According to an embodiment, one or both sides or hemispheres 31a and 31b may not have a cap or dome portion. For example, the embodiment of FIG. 39 may have a lighter weight because less material is used to form the intermediate chamber 31. For the intermediate ball 15, each side 15a and 15b may have a marker thereon to properly align the balls when fastening or connecting them together.

Referring again to FIG. 3, the ends of the intermediate ball 13 may extend into or be substantially received by the end portions 63. According to an embodiment, for example, the end portions 63 prevent at least some crushing of the ends of the oblong intermediate ball 13. Additionally, the end portions 63 may facilitate assembly of the multi-sport ball 1. For example, the end portions 63 center the intermediate ball 13 within the outer ball 11 by receiving the ends of the intermediate ball 13.

In the illustrated embodiment, the sides or hemispheres 33a and 33b of the inner chamber 33 may form a substantially spherical shape. For example, the spherical shape receives the spherically shaped inner ball 15. However, it is foreseen that the sides or hemispheres 33a and 33b of the inner chamber 33 may include one or two end portions similar to the end portions 63 of the intermediate chamber 31.

Referring again to FIG. 1, each side of the outer ball 13a, 13b may have a substantially mirror image of pentagrams thereon. It is foreseen that the pentagrams of each side 13a and 13b will line up upon fastening or connecting the two sides 13a and 13b together. For example, referring to FIGS. 1 and 2, the outer ball 11 may have five pentagrams therearound and 5 mating pairs of fasteners or connectors 35. Accordingly, the pentagrams may line up upon fastening or connecting the two sides 13a and 13b together regardless of the relative rotational position of the two sides 13a and 13b.

Figure 8:
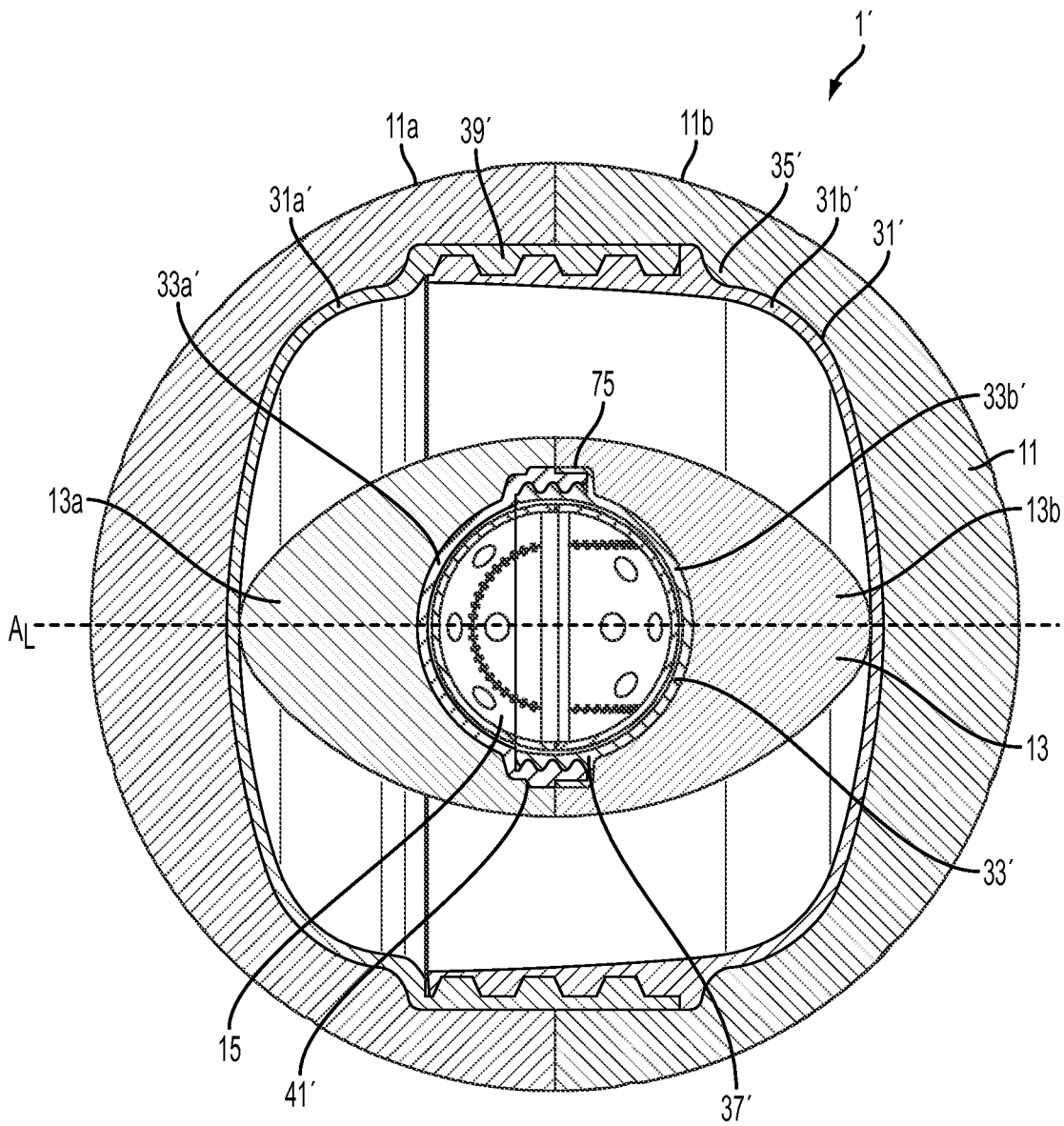
FIG. 8 is a cross-sectional view of an embodiment of a multi-sport ball.
Figure 9:
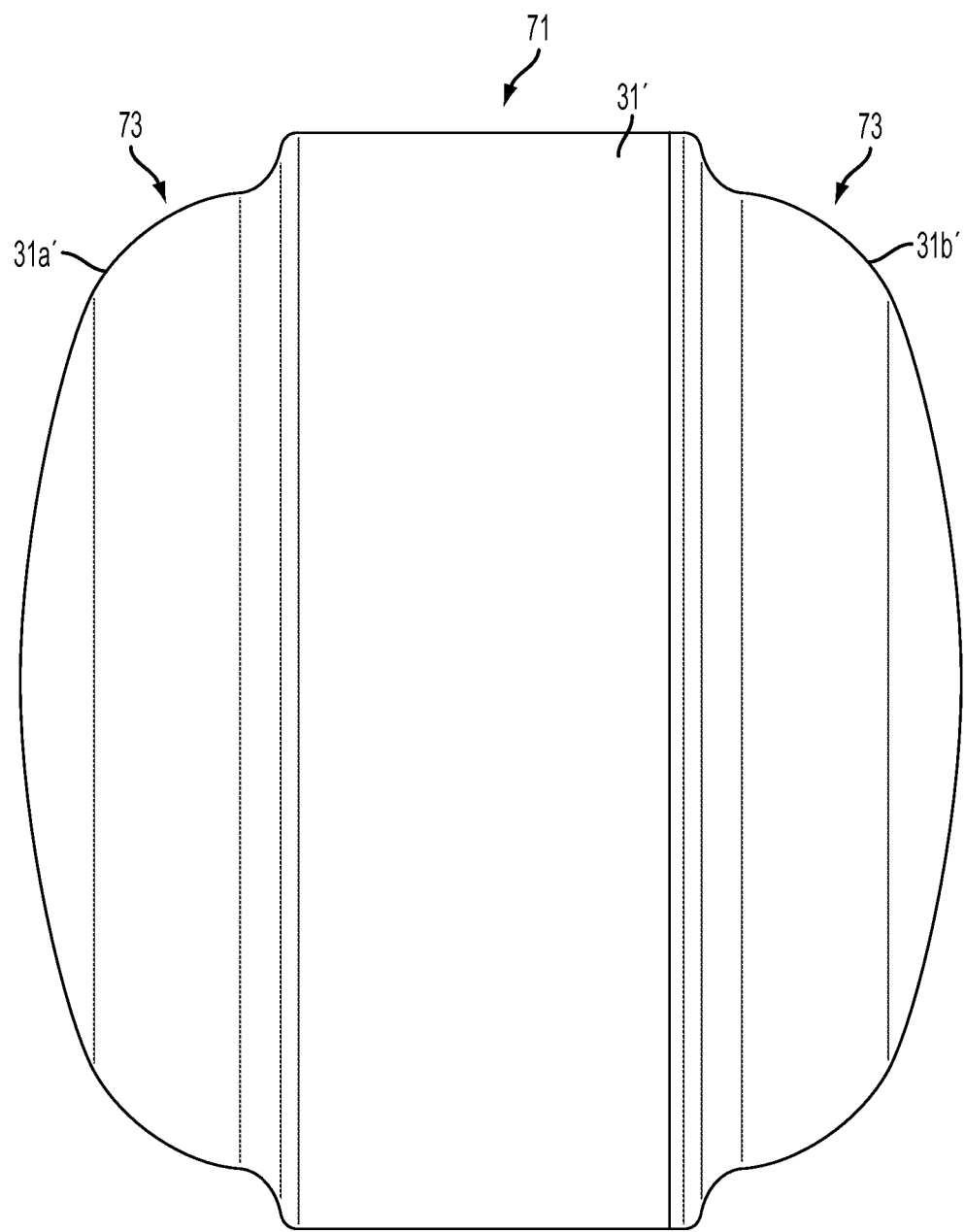
FIG. 9 is a side view of the intermediate chamber of FIG. 8.
Figure 10:
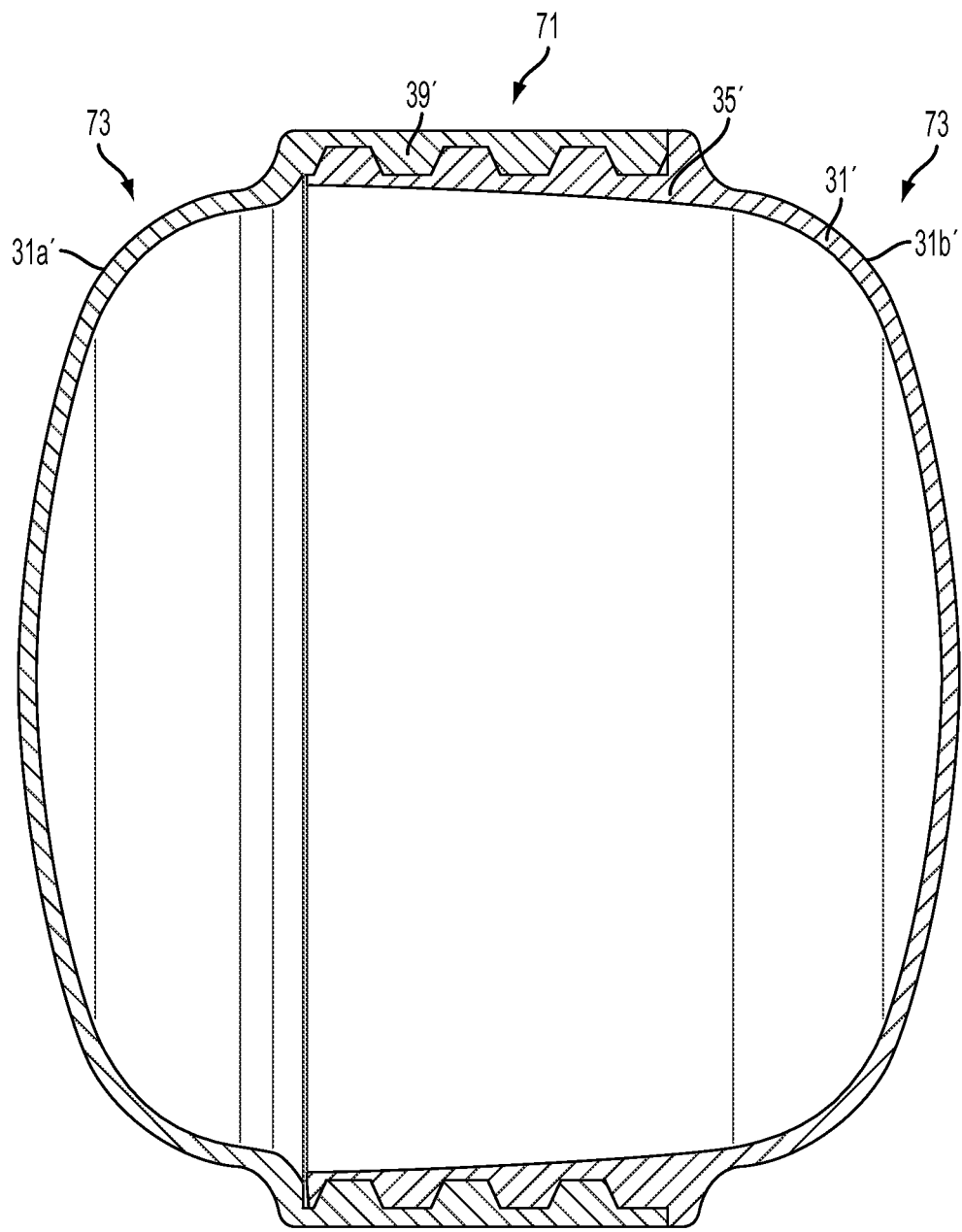
FIG. 10 is a cross-sectional view of the intermediate chamber of FIG. 9.

Referring now to FIGS. 8-10, an embodiment of multi-sport ball 1' is illustrated. The features of the embodiment are referenced with numerals of like parts of the other embodiments. For example, the embodiment of FIGS. 8-10 includes different chamber shapes and fastening or connecting structures. The intermediate chamber 31' may include two sides or hemispheres 31a' and 31b' having a fastener or connector 35', 39' in order to fasten or connect the two sides or hemispheres 31a' and 31b' together. The fastener or connector 35', 39' may comprise a threaded male portion 35' and a threaded female portion 39'. According to an embodiment, the male and female threaded portions 35' and 39' may have three threads. It is foreseen that the fastener or connector may have one, two, four, or other number of threads.

Similarly, the inner chamber 33' may include two sides or hemispheres 33a' and 33b' having a fastener or connector 37', 41' in order to fasten or connect the two sides or hemispheres 33a' and 33b' together. The fastener or connector 37', 41' may comprise a threaded male portion 37' and a threaded female portion 41'. The threaded male portion 39' may comprise a receiving lip 75 for aligning and/or receiving the female threaded portion 41'. According to an embodiment, the male and female threaded portions 37' and 41' may have three threads. It is foreseen that fastener or connector may have one, two, four, or other number of threads.

As illustrated at FIG. 8, for example, the inner shape of the inner chamber 33' may be substantially spherical. However, it is foreseen that the inner shape of the inner chamber 33' may be another shape. For example, the inner shape of the inner chamber 33' may be shaped similar to any shaped item intended to be placed therein.

According to an embodiment, the male and female threaded portions 35', 37', 39', and 41' may further comprise a detent that catches when the threaded male portions are fully engaged with the threaded female portions. The detent may prevent the sides or hemispheres 11a, 11b of the outer ball 11 and the sides or hemispheres 13a, 13b of the intermediate ball 13 from coming apart or unthreading during use. It is foreseen that the detent may be released by, for example, applying relative rotational force to the sides or hemispheres 11a, 11b, respectively, of the outer ball 11 and the sides or hemispheres 13a, 13b, respectively, of the intermediate ball 13 to disengage the threaded male portions from the threaded female portions. It is foreseen that the threads may be a trapezoidal thread, a square thread, a buttress thread, a rounded thread, and any other type of thread, as known to one of ordinary skill in the art.

It is foreseen that the intermediate ball 13 may be compressed along the longitudinal axis $A_L$ in the intermediate chamber 31' upon assembly or closure of the fastener or connector 35', 39'. For example, the uncompressed shape or length of the intermediate ball 13 along the longitudinal axis $A_L$ may be longer than when in the compressed shape as illustrated at FIG. 8. As an example, an uncompressed length of the intermediate ball 13 may be 8 inches, whereas a fully compressed length of the intermediate ball 13, as illustrated at FIG. 8, may be 6 inches. According to an embodiment, when the first thread of the threaded male portion 35' couples with the first thread of the threaded female portion 39', the intermediate ball 13 may be in its uncompressed shape or a slightly compressed state. As the threaded male portion 35' and the threaded female portion 39' engage additional threads, the intermediate ball 13 may be further compressed until the threaded male portion 35' and the threaded female portion 39' fully engaged. According to an embodiment, it is foreseen that such a configuration facilitates compression of the intermediate ball 13 with minimal linear force applied to the outer ball 11 when engaging the threads 35' and 39'. For example, a child may easily apply relative rotational force to each side or hemisphere 11a and 11b, respectively, of the outer ball 11 to fully compress the intermediate ball 13 therein. It is foreseen that the compression of the intermediate ball 13 may apply an outwardly urging force against each side 11a and 11b of the outer ball 11. For example, the outwardly urging force may urge the sides 11a and 11b apart thus providing a linear force and associated frictional force in order to prevent the fasteners or connectors from unfastening or disconnecting, such as is explained with respect to FIG. 4.

Referring now to FIGS. 9 and 10, the intermediate chamber 31' is illustrated having sides or hemispheres 31a' and 31b', as explained above. The intermediate chamber 31' may comprise a center portion 71 and end portions 73. The center portion 71 may be a substantially cylindrically shaped. According to an embodiment, the center portion 71 may be the area having the fastener or connector 35', 39'. The end portions 73 may be rounded or a spherical dome shape. It is foreseen that the end portions 73 may be other shapes such as, for example, spherical domes, squared, or other shapes, as known to one of ordinary skill in the art.

Figure 11:
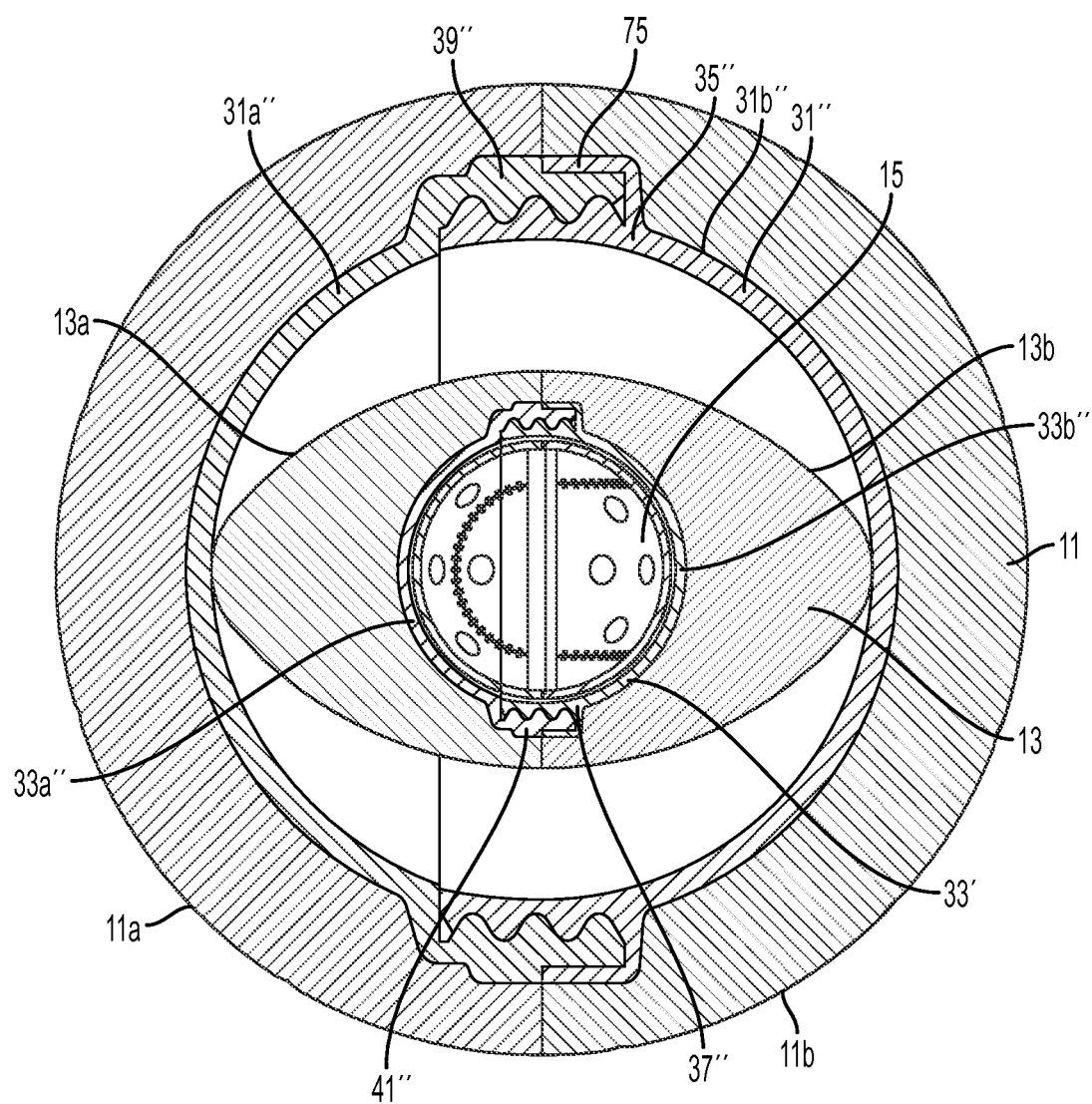
FIG. 11 is a cross-sectional view of an embodiment of a multi-sport ball.
Figure 12:
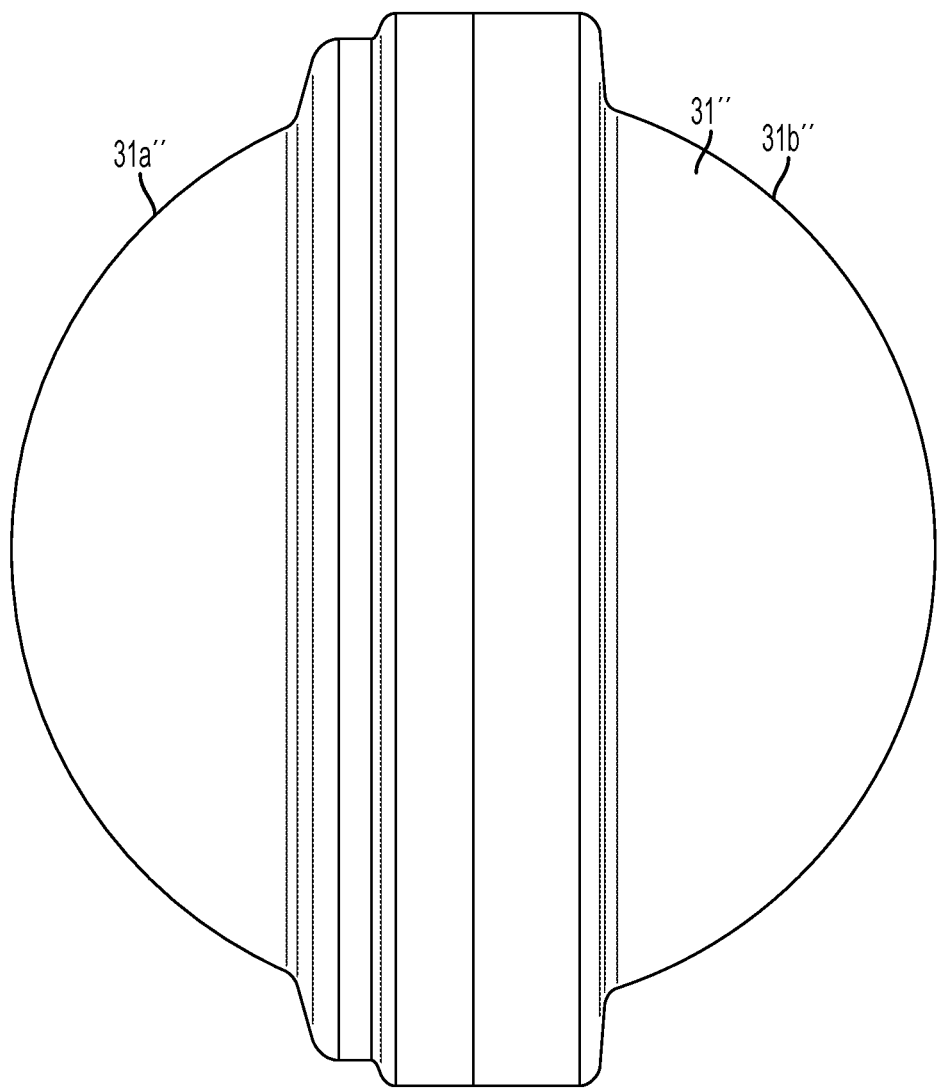
FIG. 12 is a side view of the intermediate chamber of FIG. 11.
Figure 13:
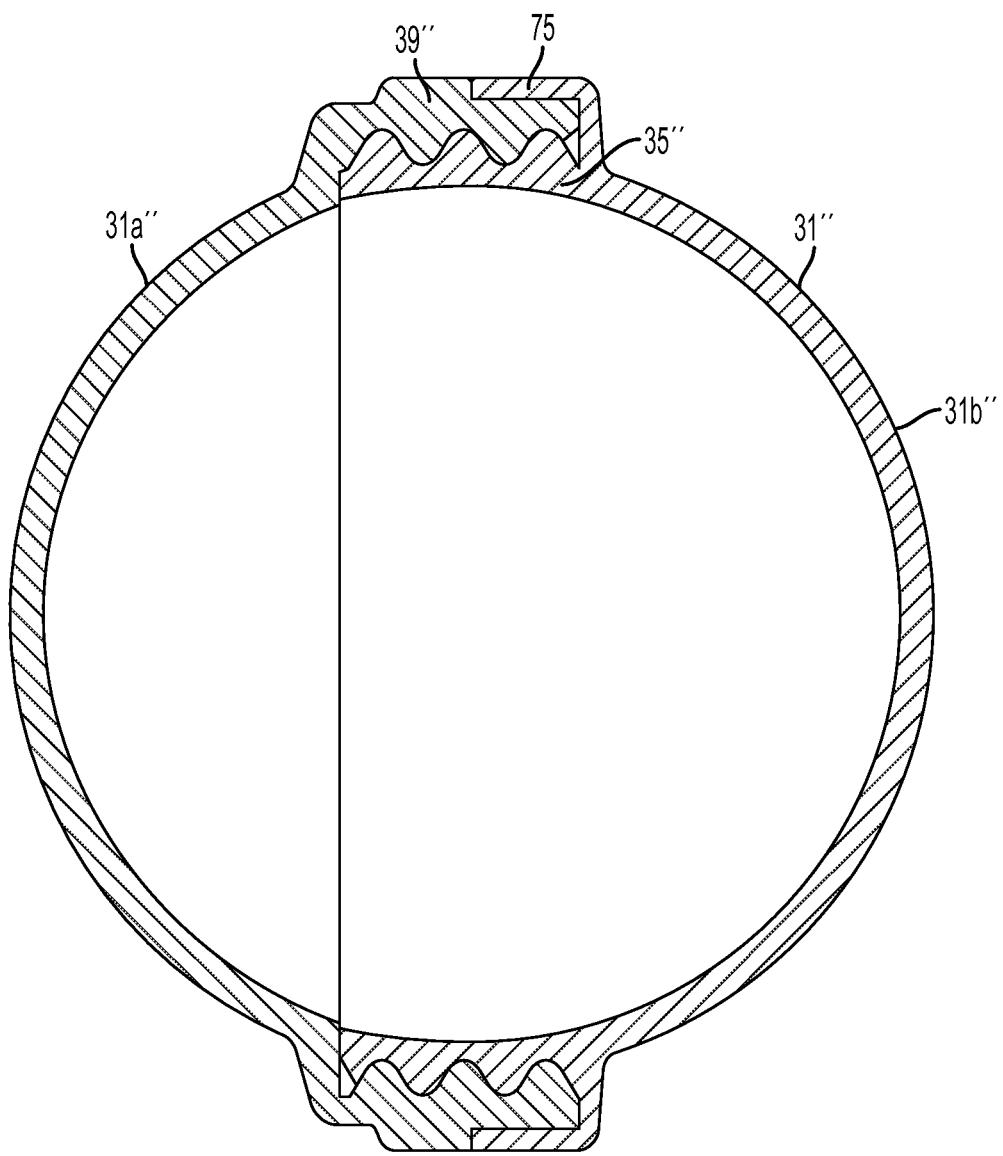
FIG. 13 is a cross-sectional view of the intermediate chamber of FIG. 12.

Referring now to FIGS. 11-13, an embodiment of the multi-sport ball 1" is illustrated. For clarity, the features of the embodiment are referenced with numerals of similar parts of the other embodiments. For example, the embodiment of FIGS. 11-13 includes different chamber shapes and fastening or connecting structures. According to an embodiment, the intermediate chamber 31" may have a substantially spherical inner shape. However, it is foreseen that the inner shape of the intermediate chamber 31" may be other shapes. For example, the inner shape of the intermediate chamber 31" may be shaped similar to any shaped item intended to be placed therein. According to an embodiment, the inner shape of the intermediate chamber 31" may be shaped in an oblong or football shape.

The intermediate chamber 31" may include two sides or hemispheres 31a" and 31b" having a fastener or connector 35", 39" in order to fasten or connect the two sides or hemispheres 31a" and 31b" together. The fastener or connector 35", 39" may comprise a threaded male portion 35" and a threaded female portion 39". According to an embodiment, the male and female threaded portions 35" and 39" may have three threads. It is foreseen that fastener or connector may have one, two, four, or other number of threads.

According to an embodiment, the threaded male portion 35" may comprise a receiving lip 75 for aligning and/or receiving the female threaded portion 39". For example, the receiving lip 75 may protect the material of the side or hemisphere 11b of the outer ball 11 from wear from contact with the female threaded portion 39".

As illustrated at FIG. 11, for example, the inner chamber 33" may have identical structure to the intermediate chamber 31" but in relatively smaller dimensions.

Figure 40:
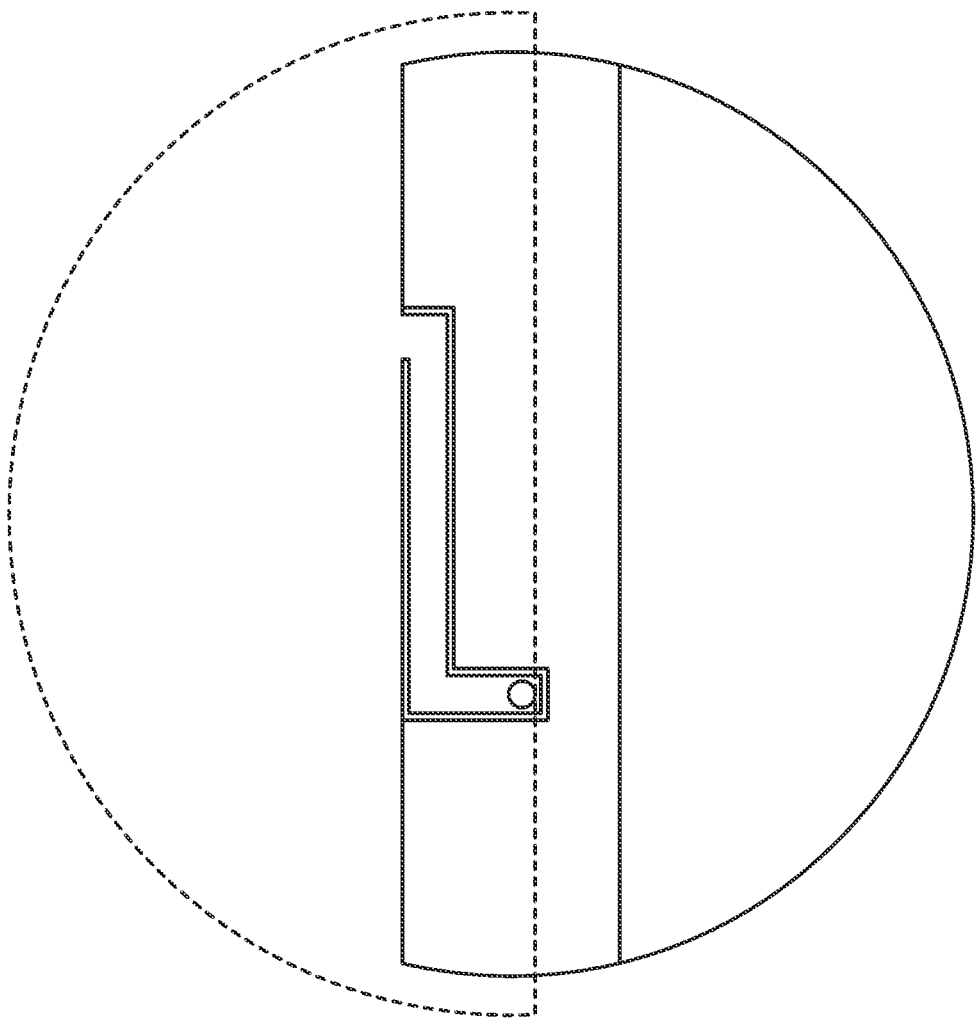
FIG. 40 is an embodiment of a multi-sport ball.

Referring now to FIG. 40, each side or hemisphere 11a and 11b of the outer ball 11 may be provided with a buckle configuration to fasten or connect the sides 11a and 11b together. For example, one side 11a may be provided with a slot, and the other side 11b may be provided with a pin. The slot may have a tortuous path and receive the pin as the sides 11a and 11b are rotated relative to each other.

Figure 14:
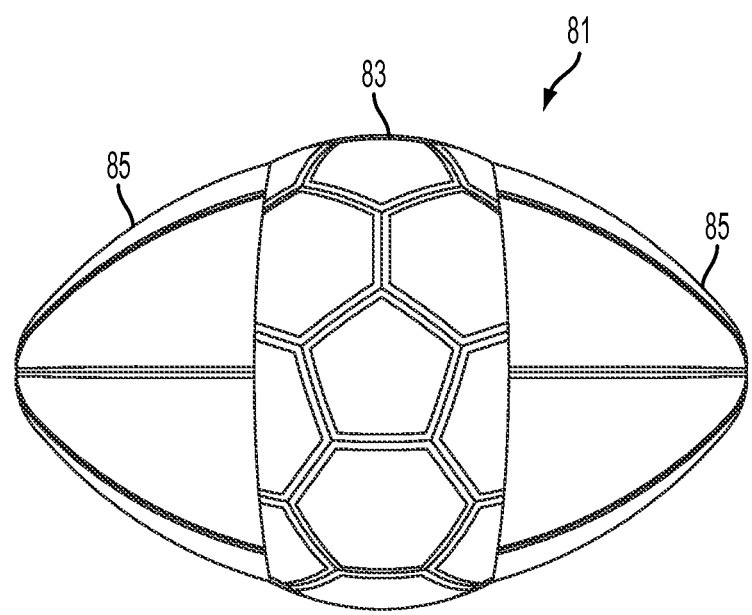
FIG. 14 is an embodiment of a multi-sport ball.
Figure 15:
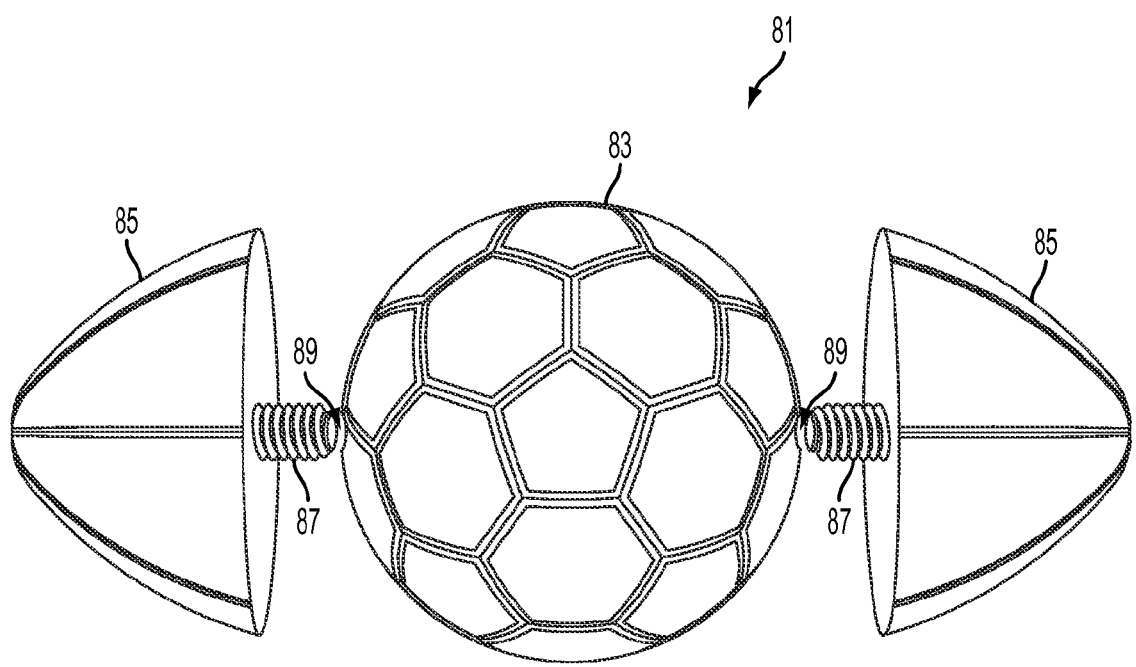
FIG. 15 is an exploded view of the multi-sport ball of FIG. 14.
Figure 16:
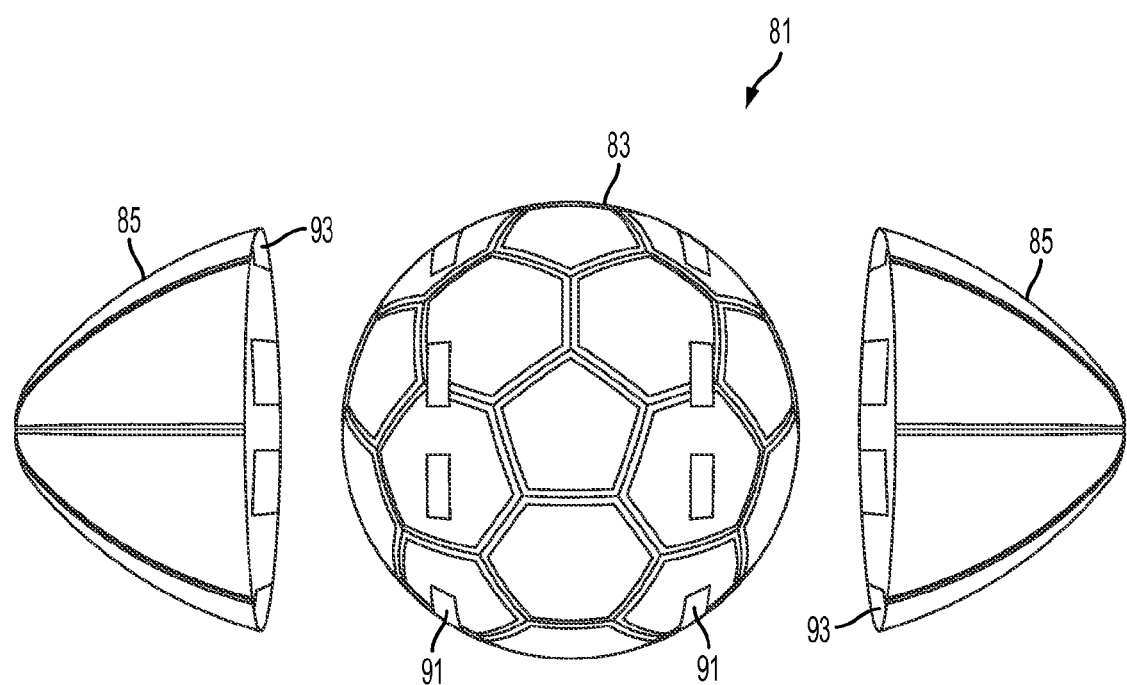
FIG. 16 is an exploded view of the multi-sport ball of FIG. 14.

Referring now to FIGS. 14-18, other embodiments of a multi-sport ball are illustrated. Referring now to FIGS. 14 and 15, a multi-sport ball 81 is illustrated. The multi-sport ball 81 may generally comprise a spherical center ball 83 and two end cones 85. The end cones 85 may be removably attached to the spherical center ball 83 with threaded connectors 87. The threaded connectors 87 may extend inwardly from the end cones 85 such that that they are received into threaded receivers formed in the spherical center ball 83. In the assembled configured, as illustrated at FIG. 14, the multi-sport ball 81 may be, for example, an oblong, football, or rugby shaped ball. Upon removal of the end cones 85, the spherical center ball 83 may be usable, for example, as a soccer ball or basketball. It is foreseen that other types of balls and shapes may be used in combination with the embodiment.

According to another embodiment of the multi-sport ball 81, the end cones 85 may be removably attached to the spherical center ball 83 with magnets or hook-and-loop fasteners 91, 93. For example, a plurality of magnets or hook-and-loop fasteners 93 may be affixed along an inner circumference of the end cones 85. A mating plurality of magnets or hook-and-loop fasteners 91 may be affixed along a circumference of the spherical center ball 83. In the assembled position, the end cones 85 are placed on the spherical center ball 83 such that the respective plurality of magnets or hook-and-loop fasteners 91, 93 mate. In order to remove the end cones 85 from the spherical center ball 83, opposite pulling force may be applied to each end cone 85.

Figure 17:
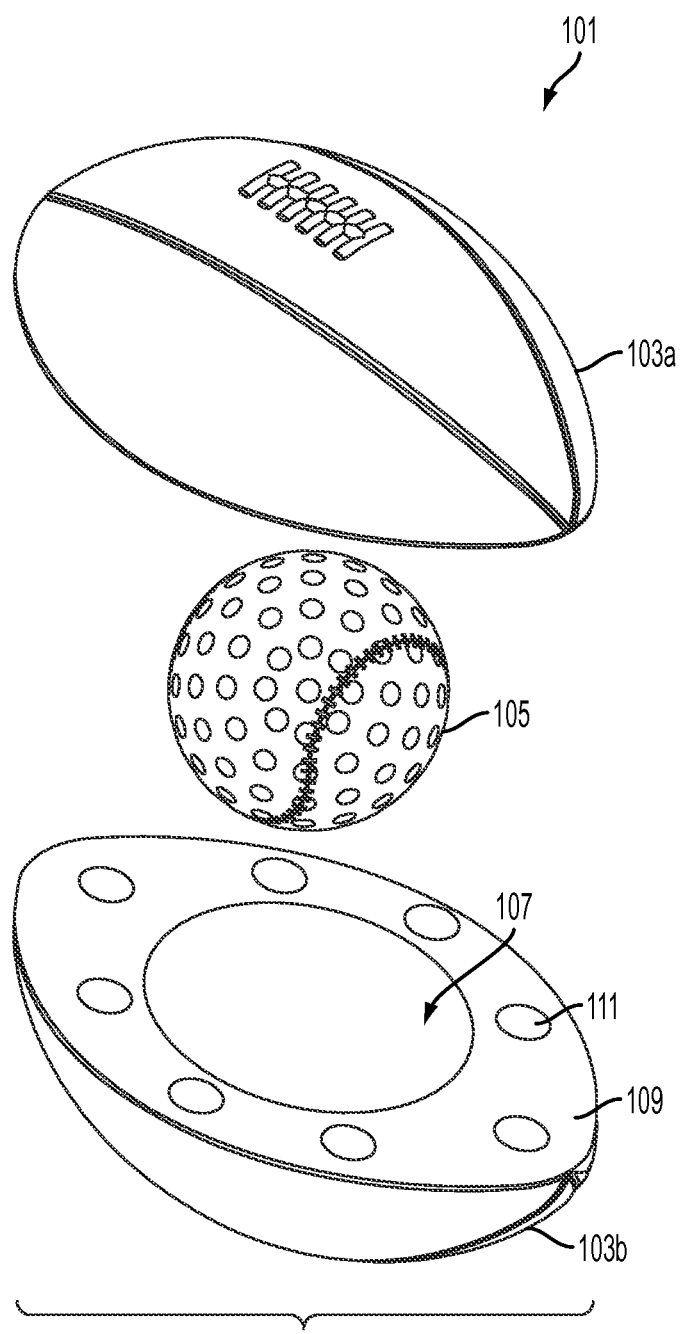
FIG. 17 is an embodiment of a multi-sport ball.

Referring now to FIG. 17, an embodiment of a multi-sport ball 101 is illustrated. The multi-sport ball 101 generally comprises an outer ball 103a, 103b and an inner ball 105. According to an embodiment, the outer ball 103a, 103b may be an oblong ball, such as, for example, a football or a rugby ball. The inner ball 105 may be a spherical ball, such as, for example, a baseball or a golf ball. It is foreseen that other types of balls and shapes may be used in combination with the embodiment.

The outer ball 103a, 103b may have a cavity 107 formed in each of two detachable sides 103a and 103b. Mating faces 109 on each of the detachable sides 103a and 103b may have a plurality of magnets or hook-and-loop fasteners 111 affixed thereon. The mating faces 109 on each of the detachable sides 103a and 103b may be placed together to form the outer ball 103a, 103b as an assembled, usable, or whole ball. The inner ball 105 may be placed into the cavity 107 or removed from the cavity 107 prior to assembling the outer ball 103a, 103b.

Figure 18:
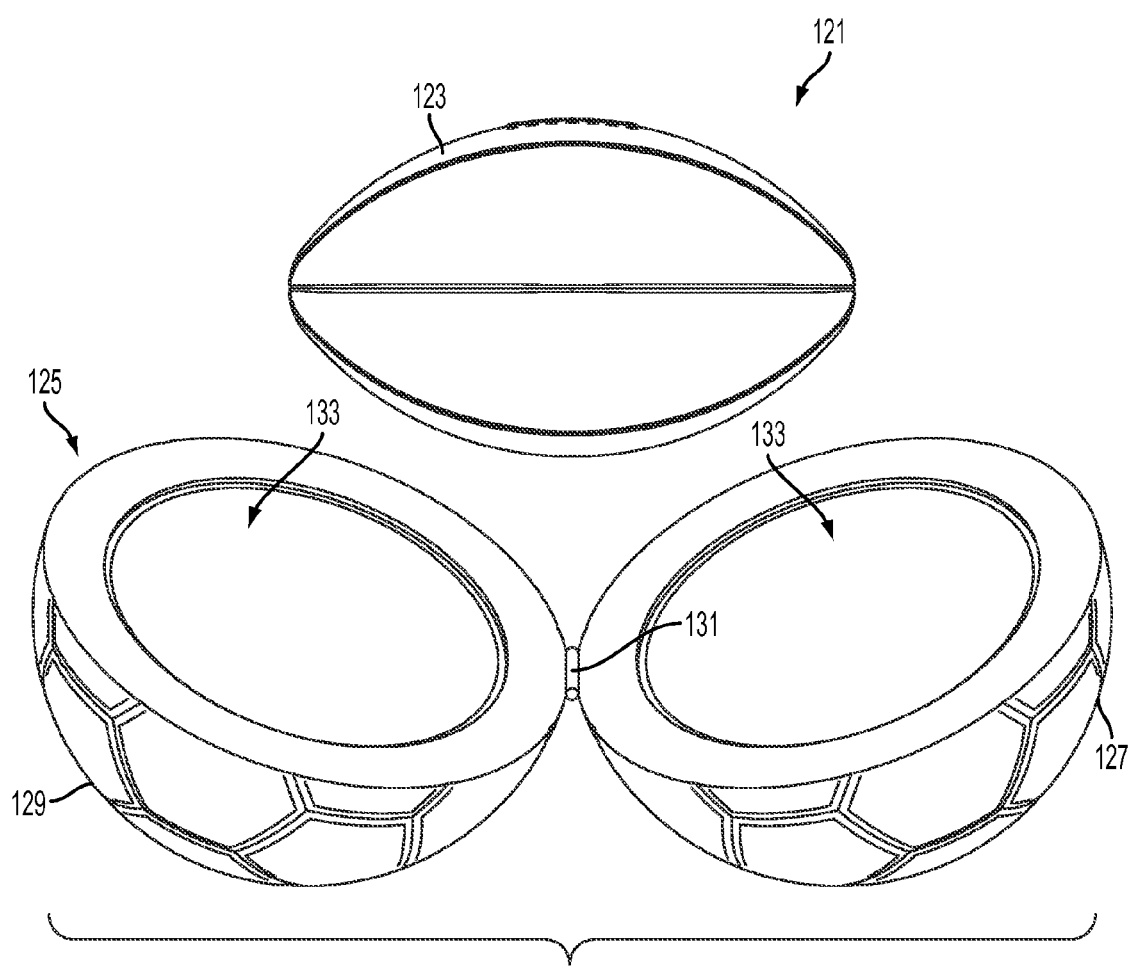
FIG. 18 is an embodiment of a multi-sport ball.

Referring now to FIG. 18, an embodiment of a multi-sport ball 121 is illustrated. The multi-sport ball 121 may generally comprise an inner ball 123 and a hinged outer ball 125. The hinged outer ball 125 includes two sides 127 and 129 connected by a hinge 131. Each side 127 and 129 of the hinged outer ball 125 forms a cavity 133 therein. The cavity may be configured or shaped to hold the inner ball 123. The hinged outer ball 125 may be a spherical ball, such as, for example, a soccer ball or a basketball. The inner ball 123 may be an oblong ball, such as, for example, a football or a rugby ball. However, it is foreseen that the outer ball 125 may be any shape of ball such as, for example, an oblong ball, a spherical ball, or other types of balls, having sides that hinge relative to each other. Similarly, the inner ball 123 may be any shape of ball or other item that fits in the cavity 133 formed in the sides 127 and 129 of the outer ball 125.

According to an embodiment, the outer ball 11 may have a recess in which a fastener or connector release is located. It is foreseen that a user may access the release in order to allow the sides 11*a* and 11*b* of the outer ball 11 to unfasten or disconnect. It is foreseen that such a release may also be incorporated into the intermediate ball 13.

It is foreseen that structure or functionality of any of the embodiments described with respect to the embodiments of the multi-sport ball described above may be used in any combination with each other. For example, the protruding face 55 of the circumferential face of the outer ball 11 or intermediate ball 13 may be used with the embodiments of FIGS. 2, 8, and 11.

Multi-Sport Apparatus

Referring now to FIGS. 19-34, embodiments of a multi-sport apparatus 131 are illustrated. The multi-sport apparatus 131 may generally comprise a handle portion 133, a head portion 135, and a hinge portion 137. As described in more detail below, the multi-sport apparatus 131 may be modified into various predetermined configurations, the respective predetermined configurations being appropriate for use in different sports. For example, in a first configuration the multi-sport apparatus 131 may be suitable for use as a baseball bat and in a second configuration the multi-sport apparatus 131 may be suitable for use as a golf club. It is foreseen that the multi-sport apparatus 131 may be configured for use in other configurations for other sports such as, for example, a cricket bat, a croquet mallet, or an apparatus suitable for other types of sports.

Figure 19:
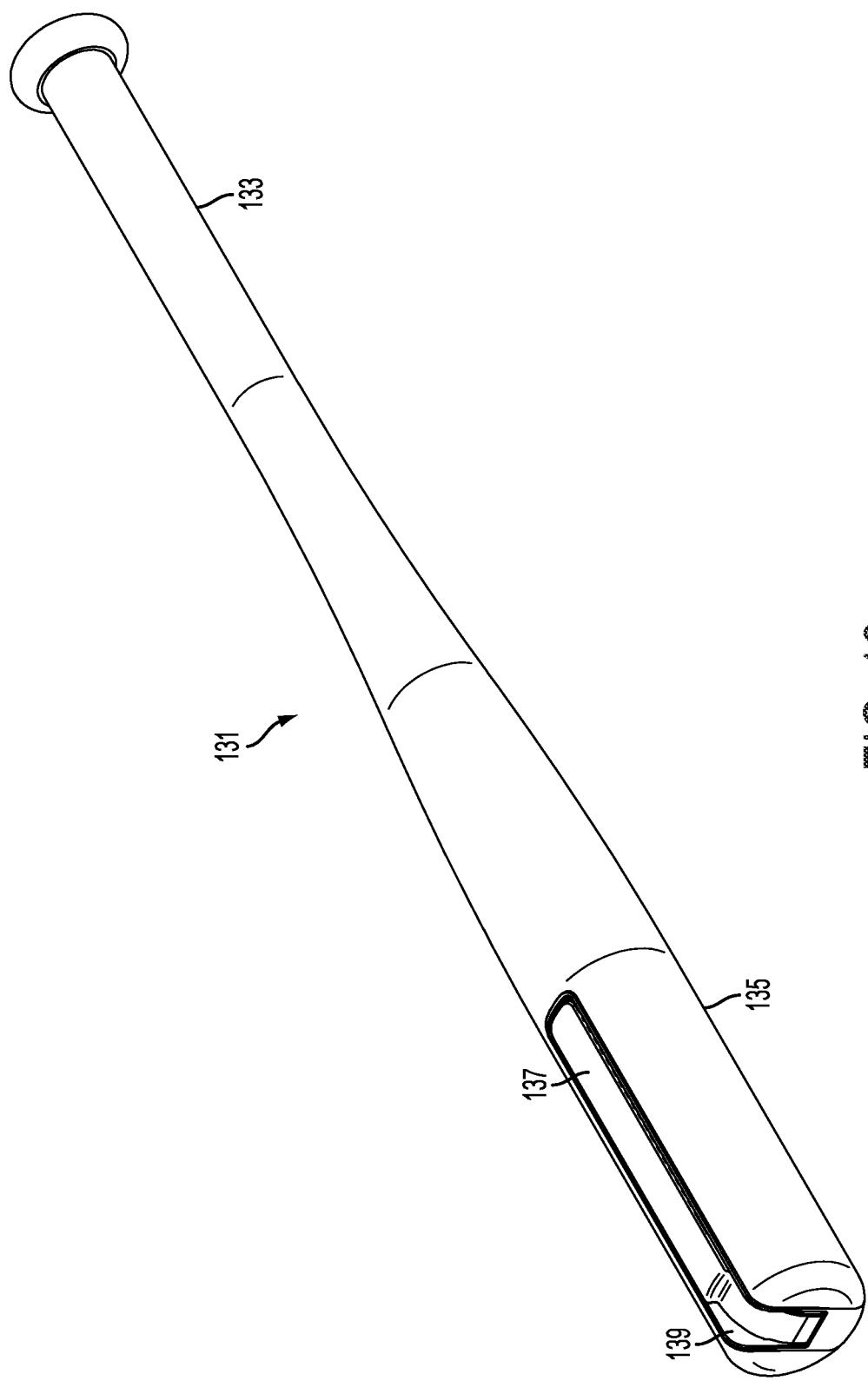
FIG. 19 is an embodiment of a multi-sport apparatus.

Referring now to FIG. 19, an embodiment of the multi-sport apparatus 131 is illustrated. According to the embodiment, the handle portion 133 may be integrally attached to the head portion 135. For example, according to an embodiment, the handle portion 133 may not removable from the head portion 135. The head portion 135 may have a slot 139 formed therein for hingedly receiving the hinge portion 137. The slot 139 may be formed at least partially through a diameter of the head portion 135. According to an embodiment, the slot 139 may be formed completely through the diameter of the head portion 135.

Figure 20:
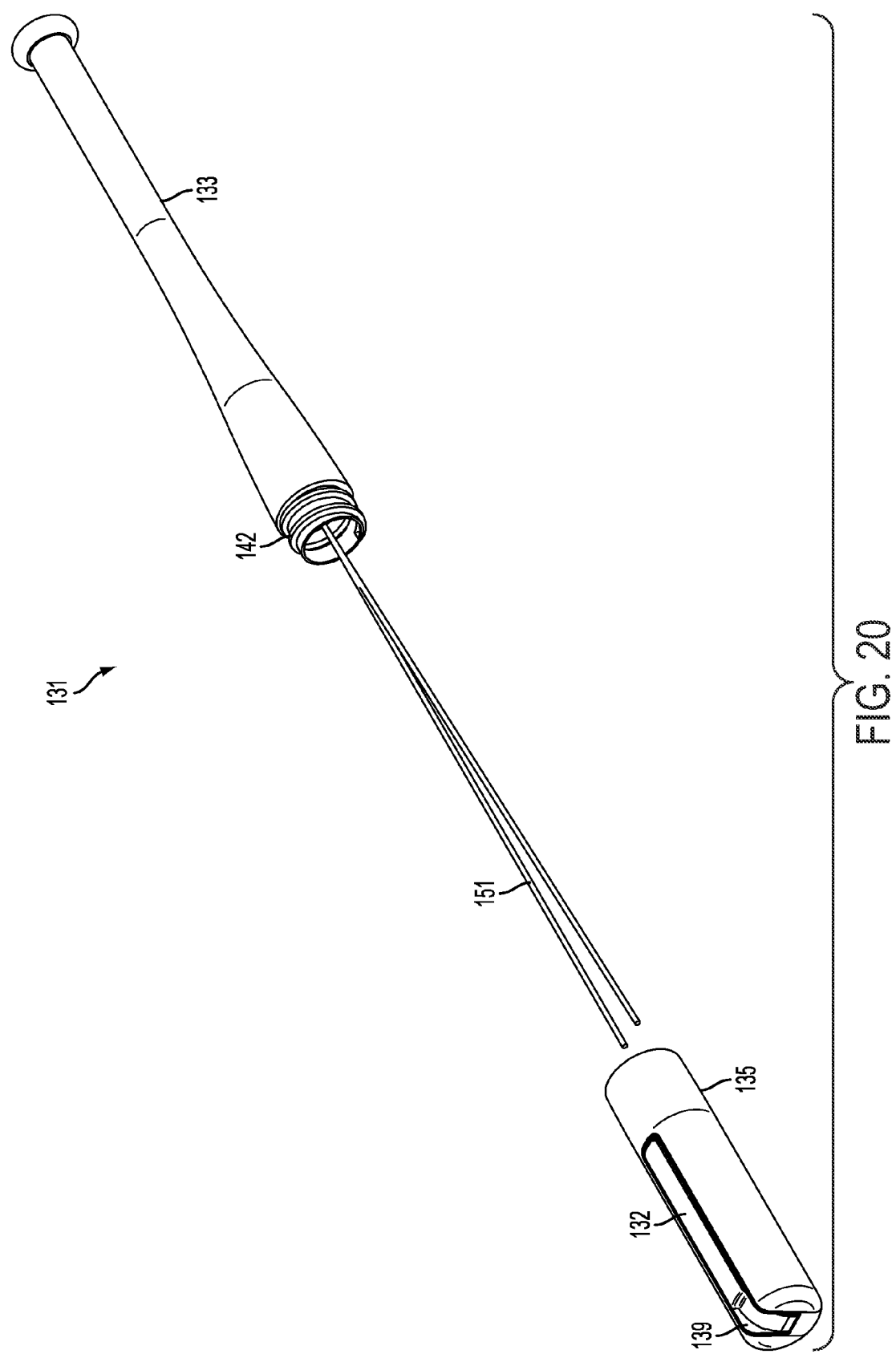
FIG. 20 is an embodiment of a multi-sport apparatus.
Figure 21:
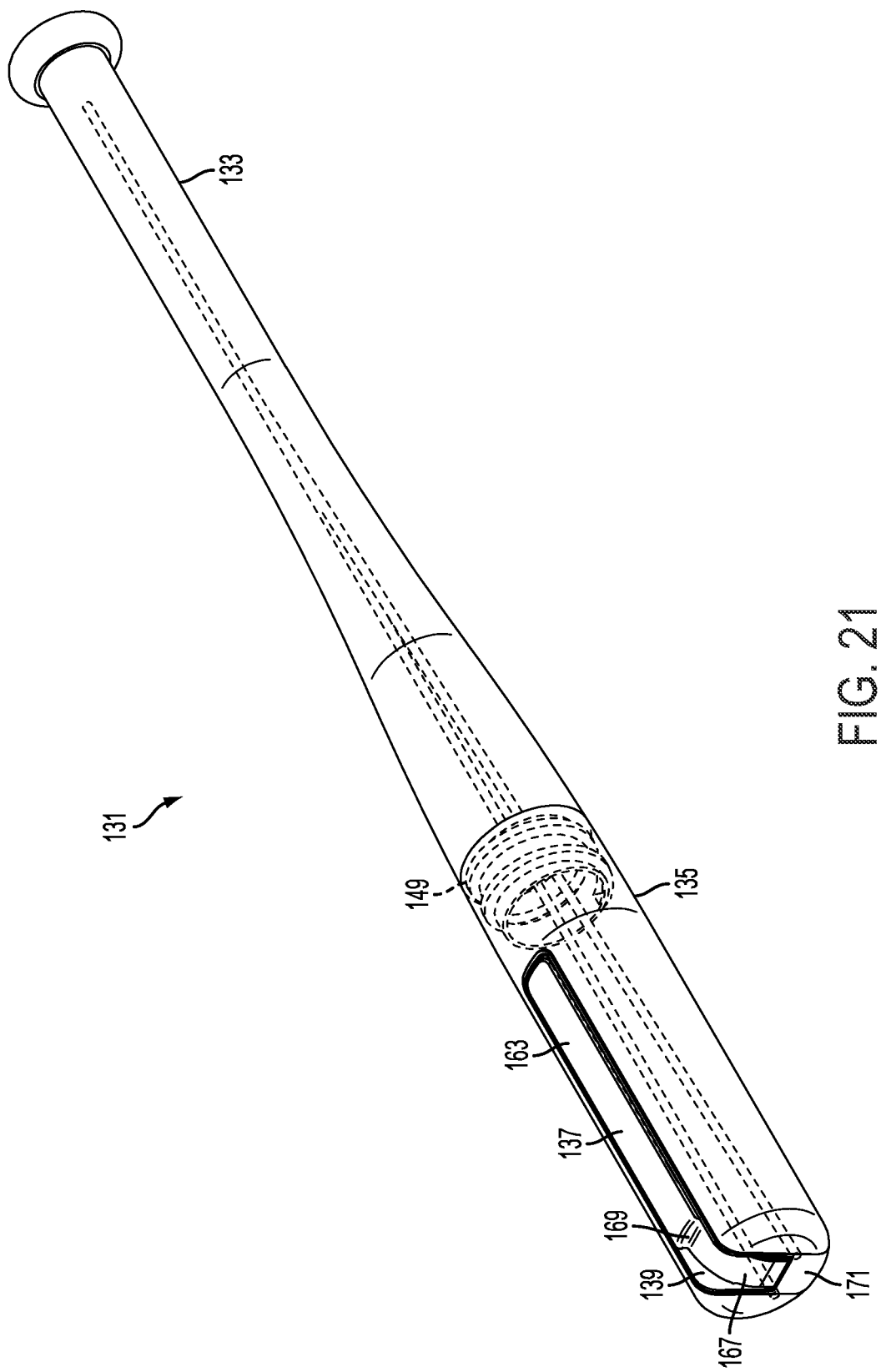
FIG. 21 is an assembled view of the multi-sport apparatus of FIG. 20 in a first configuration.
Figure 22:
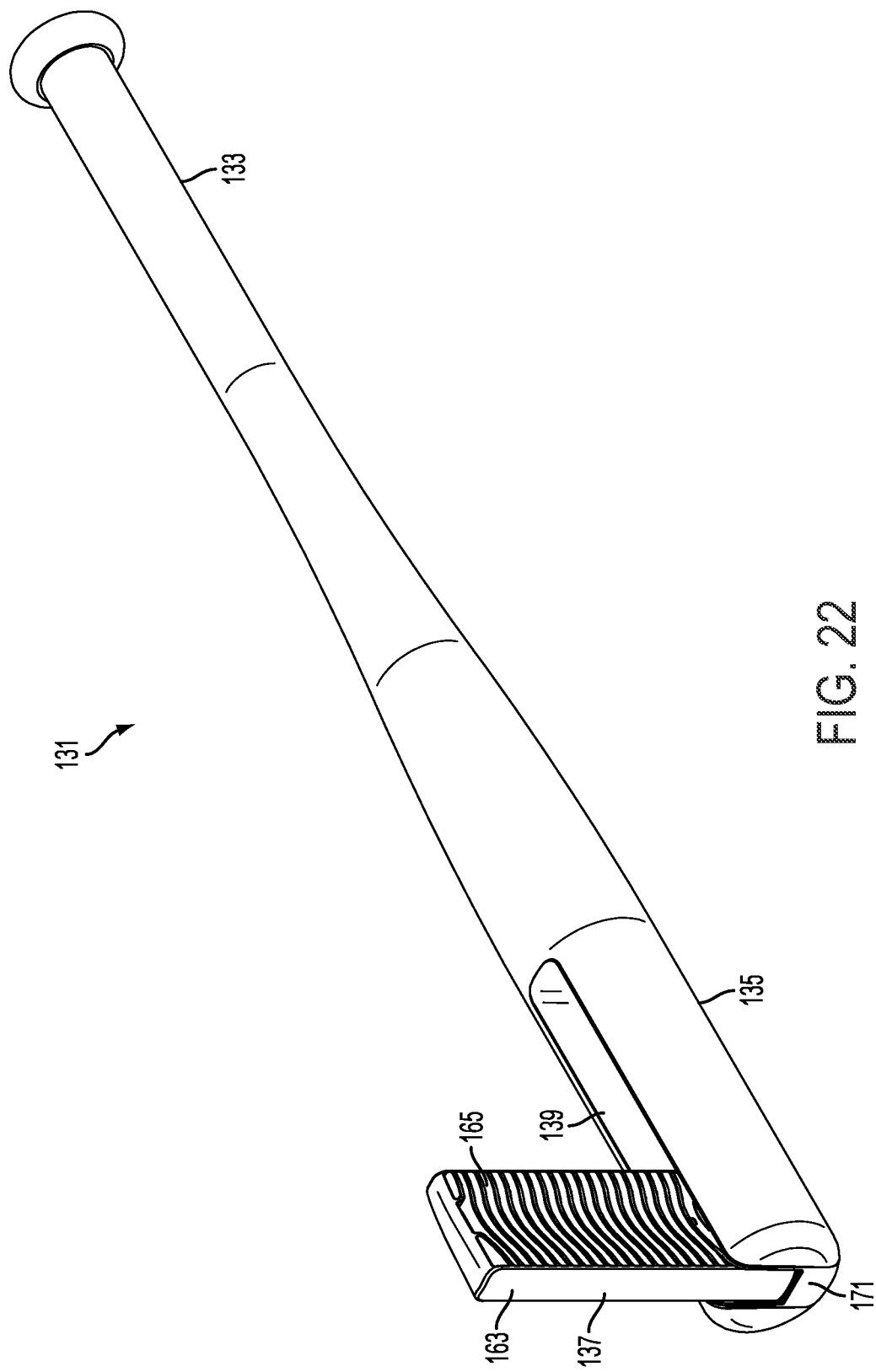
FIG. 22 is the multi-sport apparatus of FIG. 21 in a second configuration.

Referring now to FIGS. 20-22, an embodiment of the multi-sport apparatus 131 is illustrated. According to the embodiment, the head portion 135 may be removable from the handle portion 133. For example, an end of the handle portion 133 may have a threaded connection 147 and an end of the head portion 135 may have a corresponding threaded connection 149. As illustrated in FIGS. 20 and 21, the threaded connection 147 of the handle portion 133 may be a male threaded connection and the threaded connection 149 of the head portion 135 may be a female threaded connection. However, it is foreseen that the handle portion 133 may have the female threaded connection and the head portion 135 may have the male threaded connection. It is also foreseen that other types or means of connection may be used to attach the head portion 135 to the handle portion 133. For example, the head portion 135 may be attached to the handle portion 133 with magnets, hook-and-loop fasteners, a detent, or other connecting devices as known to one of ordinary skill in the art.

According to an embodiment, one or both of the handle portion 133 and the head portion 135 may have a compartment formed therein. For example, one or both of the handle portion 133 and the head portion 135 may be hollow portions. When the handle portion 133 and the head portion 135 are attached or threaded together, the compartment may be a water-tight or waterproof compartment. As illustrated at FIG. 21, the compartment in the handle portion 133 and the head portion 135 may be used for storage. For example, the compartment may be used to store sports equipment 151 such as a kite, a net, flags, or other sports equipment, as known to one of ordinary skill in the art. It is foreseen that other items may be stored in the compartment, such as, for example, personal items, keys, phone, wallet, papers, or other items as known to one of ordinary skill in the art.

Referring now to FIGS. 21 and 22, the hinge portion 137 may be hinged between a first configuration, illustrated at FIG. 21, and a second configuration, illustrated at FIG. 22. In the first configuration, for example, the hinge portion 137 may be at least partially or completely within the slot 139 of the head portion 135. In the second configuration, for example, the hinge portion 137 may be at least partially or completely outside the slot 139 of the head portion 135.

According to an embodiment, the hinge portion 137 may be generally rectangular in shape having a bottom section 163 and a face section 165. It is foreseen, however, that the hinge portion 137 may be other shapes, such as, for example, oval, rounded, polygonal, or other shape, as known to one of ordinary skill in the art. According to an embodiment, the face section 165 may be textured or smooth. For example, the face section 165 may include grooves similar to a golf club face.

In order to facilitate rotation or hinging of the hinge portion 137, at an end of the hinge portion 137 near the axis of rotation, a cutout 167 may be formed in the bottom section 163 to form a stop 169. The cutout 167 may allow rotation of the hinge portion 137 to the second configuration until the stop 169 abuts against a corresponding stop portion 171. As illustrated at FIG. 22, for example, the stop 169 and stop portion 171 are configured to allow rotation of the hinge portion 137 of approximately 90 degrees. It is foreseen that the stop 169 and stop portion 171 may be modified to allow different degrees of rotation such as, for example, greater than or less than 90 degrees of rotation.

According to an embodiment, the hinge portion 137, stop portion 171, and/or head portion 135 may further comprise means for releasably fixing the hinge portion 137 in the first and/or second configurations. For example, the stop 169 may be a magnet and the stop portion 171 may be a ferromagnetic metal so that when the hinge portion 137 is in the second configuration, the stop 169 magnetically and releasably affixes to the stop portion 171. As another example, the stop 169 may have a hook-and-loop fastener attached thereto and the stop portion 171 may have a corresponding hook-and-loop fastener so that the hook-and-loop fasteners affix to each other when the hinge portion is in the second configuration. Similarly, a magnet or hook-and-loop fastener may be used to releasably affix the hinge portion 137 in the first configuration. According to yet another embodiment, the cutout 167 or portion of the hinge portion 137 may releasably engage a detent within the slot in both the first and second configurations. It is foreseen that other means of releasably affixing the hinge portion 137 in the first and second configurations may be used, as known to one of ordinary skill in the art.

Figure 23:
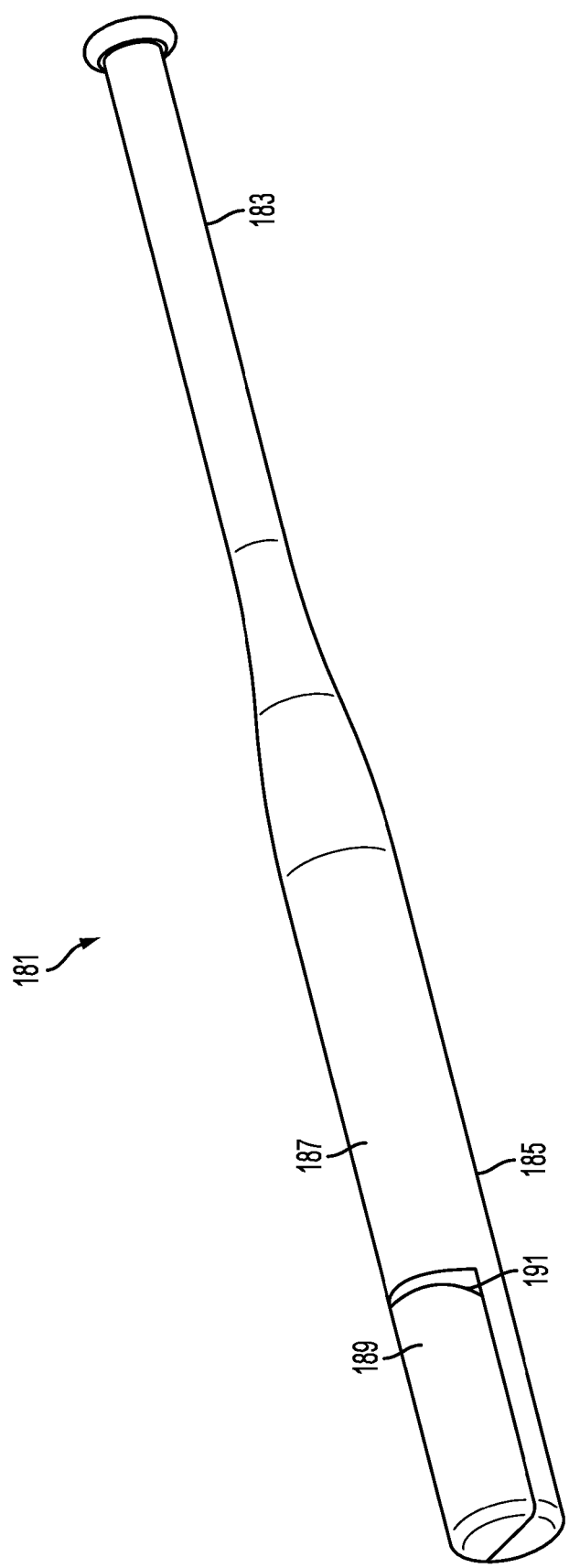
FIG. 23 is an embodiment of a multi-sport apparatus in a first configuration.
Figure 24:
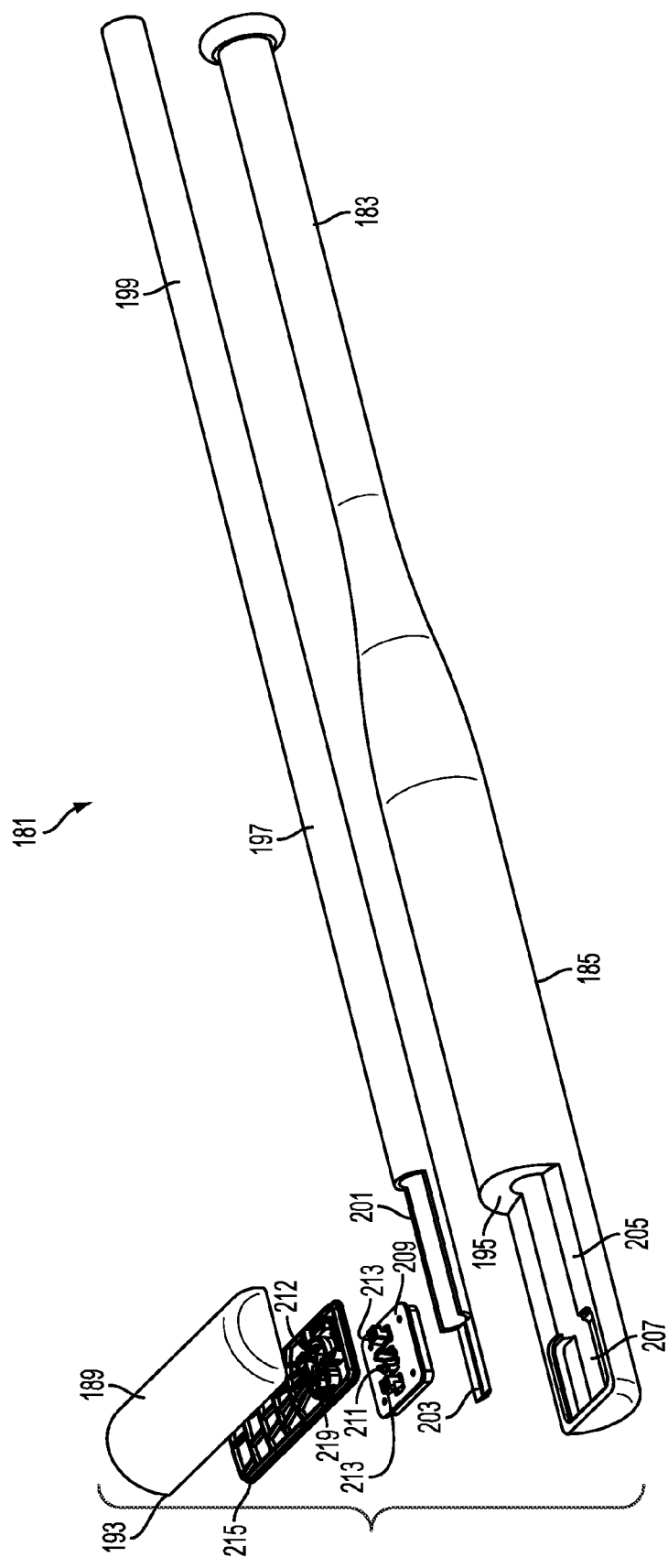
FIG. 24 is an exploded view of the multi-sport apparatus of FIG. 23.
Figure 25:
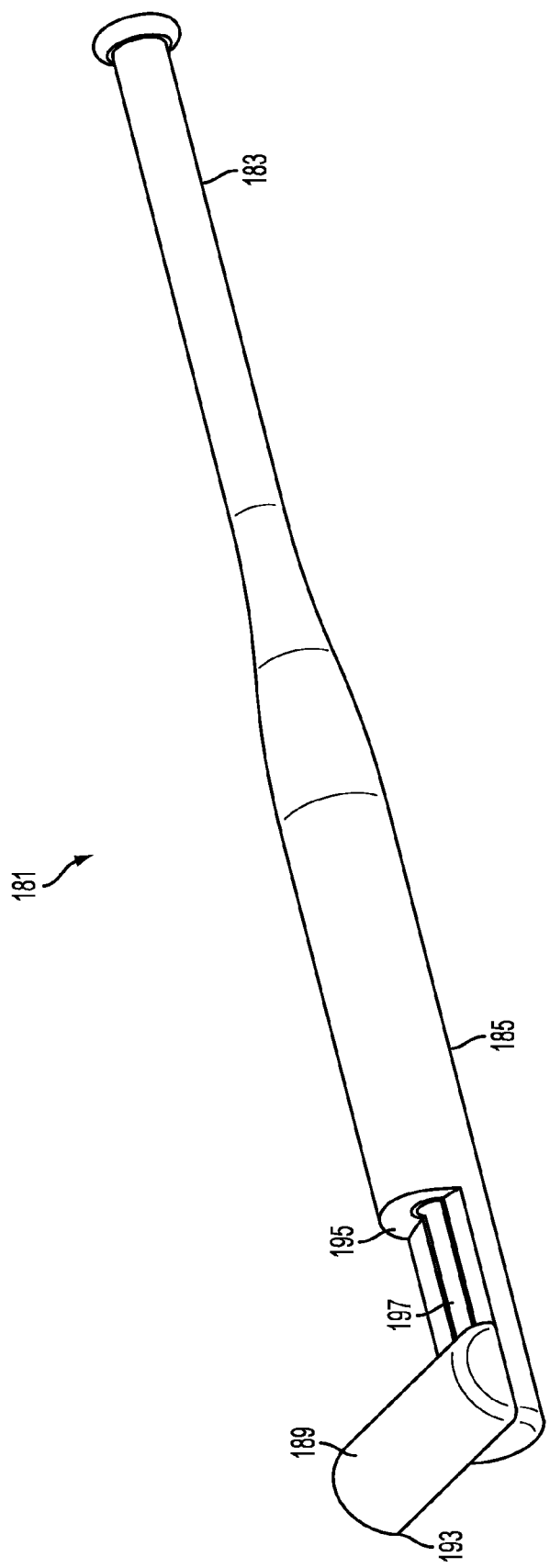
FIG. 25 is the multi-sport apparatus of FIG. 23 in a second configuration.

Referring now to FIGS. 23-25, an embodiment of the multi-sport apparatus 181 is illustrated. The multi-sport apparatus 181 may have an integrally formed handle portion 183 and head portion 185. The head portion 185 may comprise a body 187 and a hinge portion 189. The hinge portion 189 is rotatable or hingeable between a first configuration, as illustrated at FIG. 23, and a second configuration, as illustrated at FIG. 25. In the first configuration, the head portion 185 is substantially cylindrical and may be used as, for example, a baseball bat. In the second configuration, the hinge portion 189 protrudes outwardly from the substantially cylindrical shape of the body 187 and may be used as, for example, a golf club. In order to allow rotation of the hinge portion 189 relative to the body 187 of the head portion 185, the bottom end of the hinge portion 189 may have a curved edge 191 at one corner. For example, the curved edge 191 allows for rotation of the hinge portion 189 in a direction away from the curved edge 191. The corner 193 may be shaped such that, in the first position, the corner 193 abuts against wall 195 of the body 187. Accordingly, the hinge portion 189 having the curved edge 191 and the corner 193 may be rotated in only one direction relative to the body 187 of the head portion 185. The hinge portion 189 may have an end having an angled or wedge surface.

As explained above with respect to other embodiments, the hinge portion 189 and/or body 187 may further comprise means for releasably fixing the hinge portion 137 in the first and/or second configurations. For example, the hinge portion 189 may releasably engage a detent in the body 187.

Referring now to FIG. 24, a rod 197 may be disposed within the handle portion 183 and head portion 185. For example, the rod 197 may be disposed along the longitudinal axis and may provide rigidity to the multi-sport apparatus 181. The rod 197 may have a cylindrical section 199, a cut-away section 201, and an upper section 203. The cut-away section 201 may be formed such that it does not extend above the planar surface 205 of the body 187. The upper section 203 may extend into a carrier section 207 of the body 187.

A carrier 209 may be disposed and affixed within the carrier section 207. The carrier 209 may comprise a rotational axis pin 211 and at least one or two rotational stops 213. The hinge portion 189 may further comprise the face 215 having a circular axis pin receiver 217 and rotational stop receivers 219 corresponding to the rotational axis pin 211 and rotational stops 213. The face 215 may be fixedly attached to the hinge portion 189. As the hinge portion 189 rotates on the carrier 209, the rotational stop 213 engages the rotational stop receiver 219 at each of the first configuration and the second configuration so that the hinge portion 189 does not over rotate beyond a desired range of rotation. It is foreseen that the position of the rotational stops 213 and/or the rotational stop receiver 219 may be adjusted in order to adjust the angle of rotation of the hinge portion 189. For example, the angle of rotation may be set to 90 degrees. However, it is foreseen that the angle of rotation, for example, may be greater or less than 90 degrees.

Figure 26:
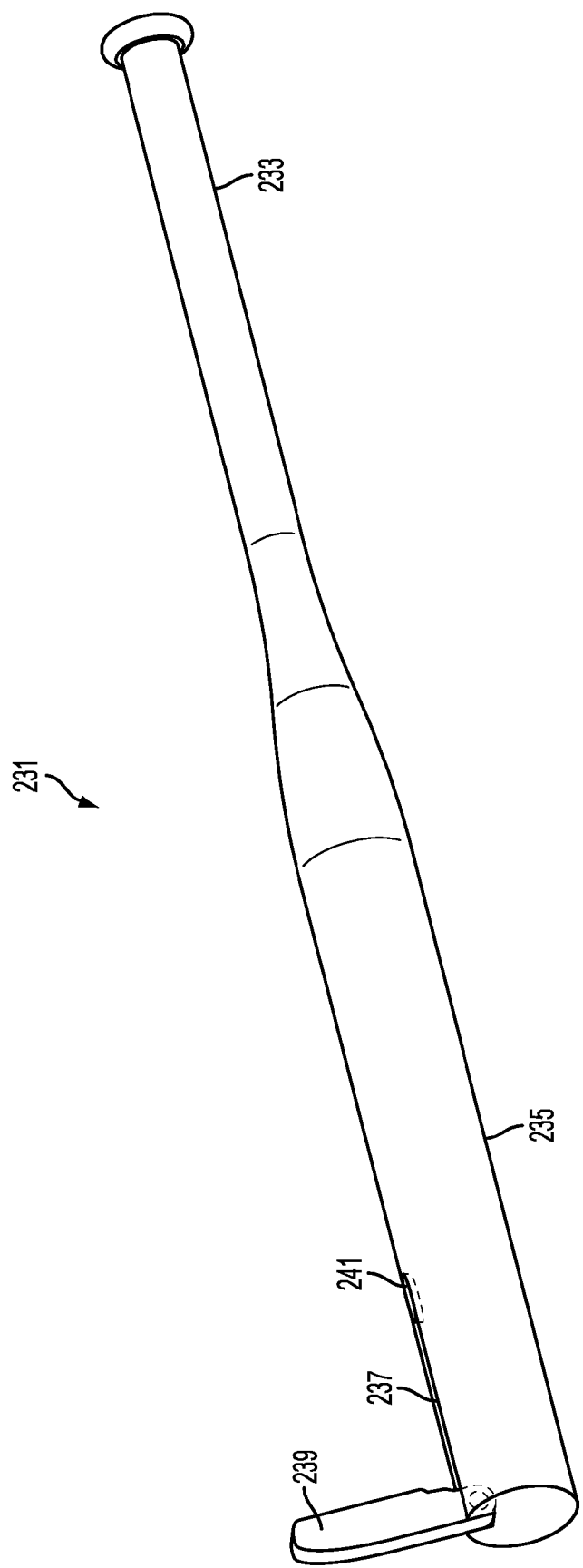
FIG. 26 is an embodiment of a multi-sport apparatus in a second configuration.
Figure 27:
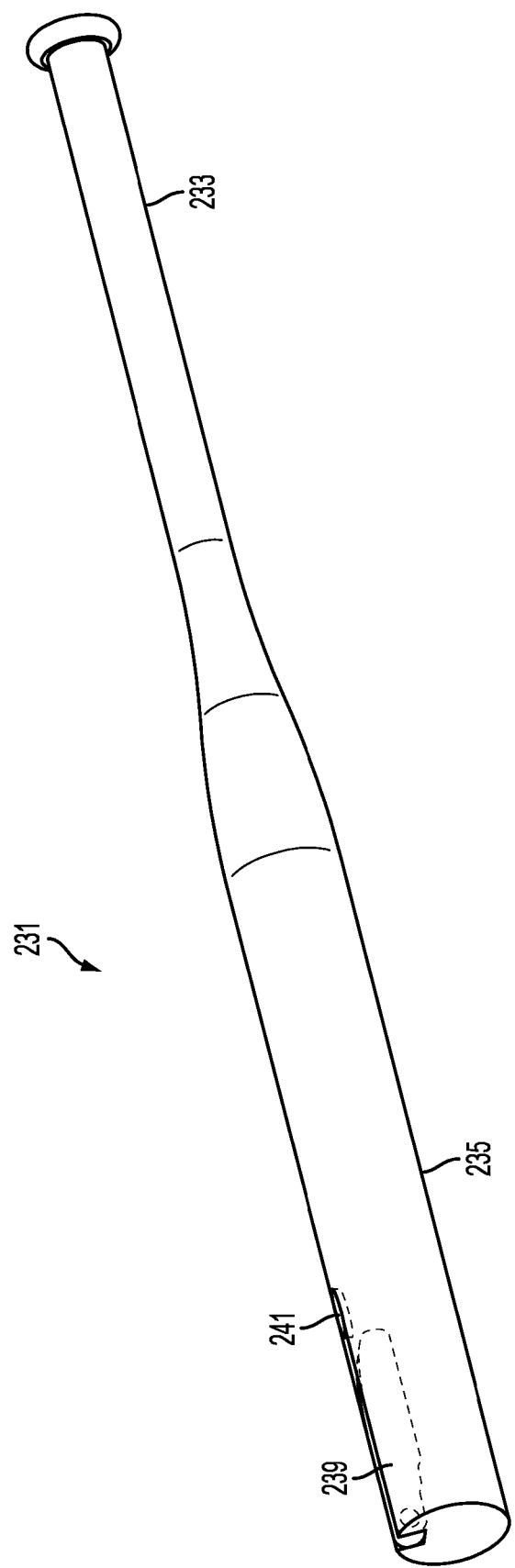
FIG. 27 is the multi-sport apparatus of FIG. 26 in a first configuration.

Referring now to FIGS. 26 and 27, an embodiment of the multi-sport apparatus 231 is illustrated. The multi-sport apparatus 231 may generally comprise a handle portion 233 and a head portion 235. The head portion 235 may have a slot 237 therein to receive a hinged portion 239. According to the embodiment, the hinged portion 239 may rotate between the first configuration, as illustrated at FIG. 27, in which the hinged portion 239 is received substantially within the slot 237, and the second configuration, as illustrated at FIG. 26. According to an embodiment, the hinged portion 239 may have a spring loaded mechanism to urge the hinged portion to the second configuration. For example, the slot 237 may have a detent to releasably catch the hinged portion in the first configuration. A detent release button 241 may be provided to release the hinged portion 239 so that it springs to the second position. It is foreseen that the detent release button 241 may be located on the head portion 235. According to an embodiment, the detent release button 241 may be located on either end of the multi-sport apparatus 231 or on the handle portion 233.

Figure 28:
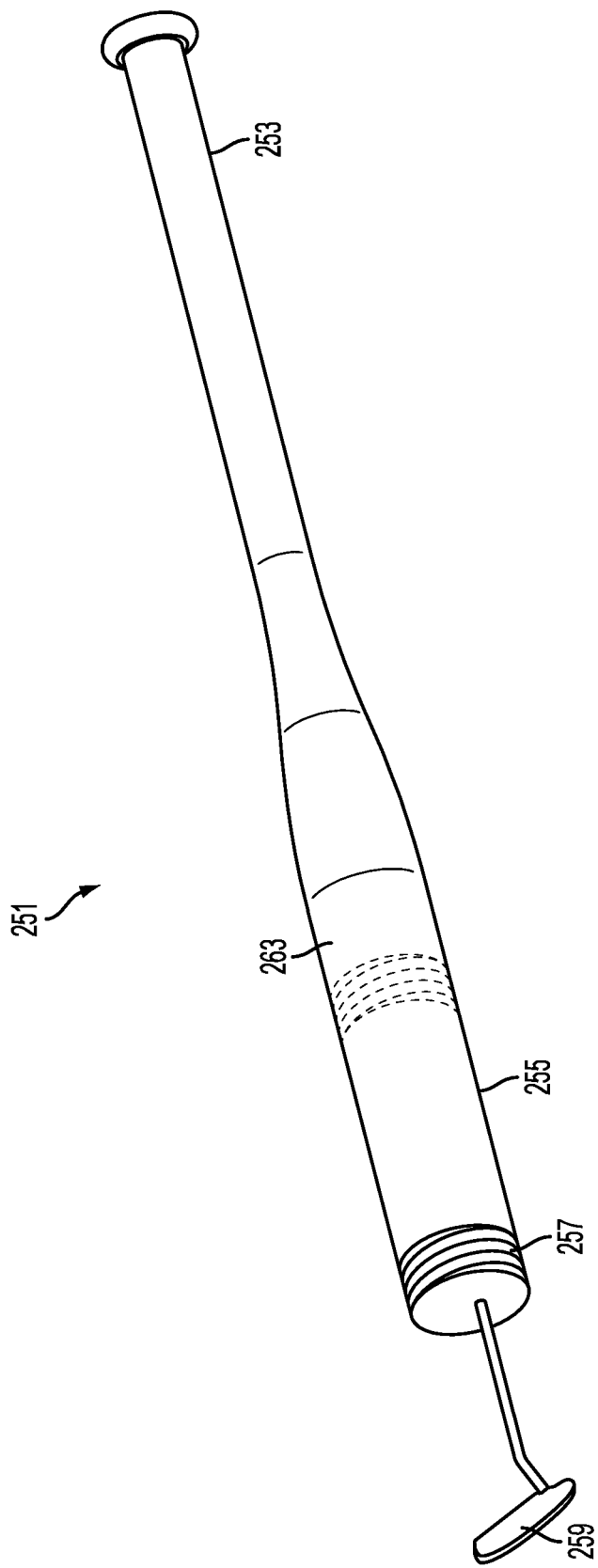
FIG. 28 is an embodiment of a multi-sport apparatus in a second configuration.
Figure 29:
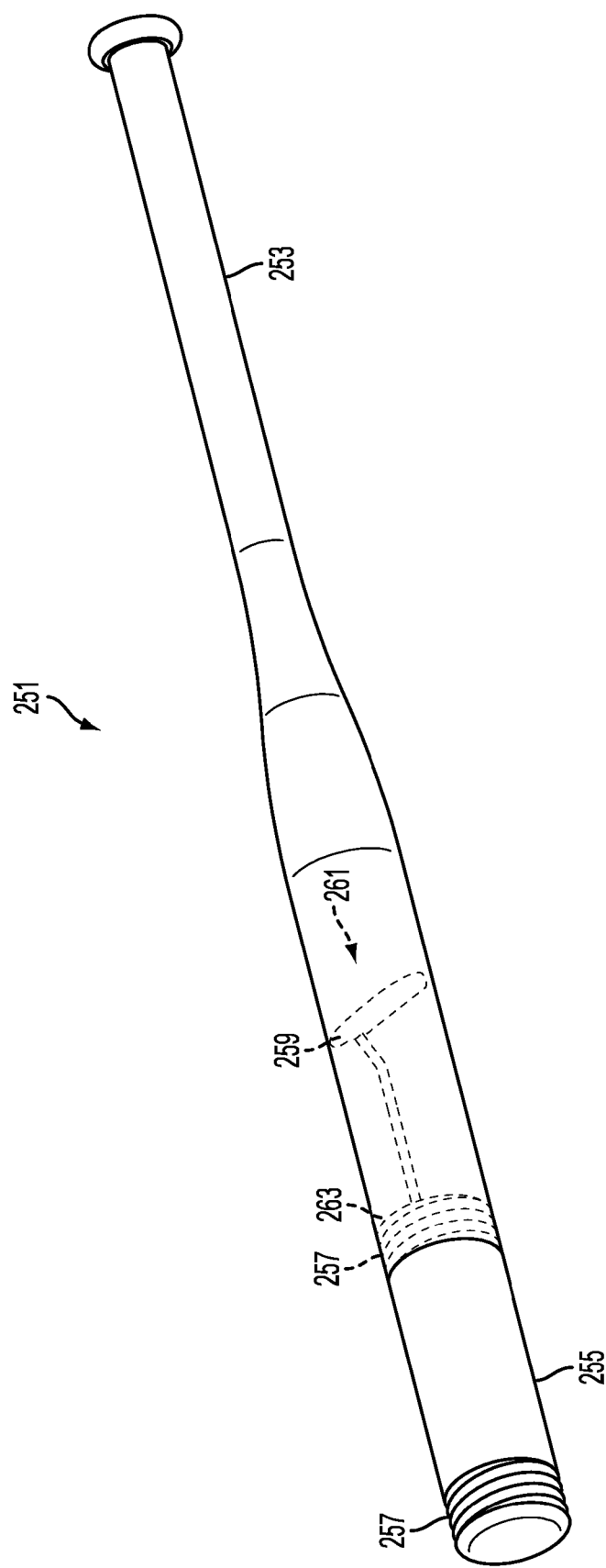
FIG. 29 is the multi-sport apparatus of FIG. 28 in a first configuration.

Referring now to FIGS. 28 and 29, an embodiment of the multi-sport apparatus 251 is illustrated. The multi-sport apparatus 251 may generally comprise a handle portion 253 and a head portion 255. Each end of the head portion 255 may be a male threaded connection 257. At one end of the head portion, a club head 259 may extend therefrom. In a first configuration, as illustrated at FIG. 29, the club head 259 may be received into a hollow compartment 261 of the handle portion 253. In the first configuration, the male threaded connection 257 of the head portion may engage a female threaded portion 263 on the inner wall of the hollow compartment 261. In a second position, as illustrated at FIG. 28, the head portion 255 may be reversed so that the club head 259 extends outwardly from the handle portion 253. In the second configuration, the male threaded connection 257 of the head portion may engage the female threaded portion 263 on the inner wall of the hollow compartment 261.

Figure 30:
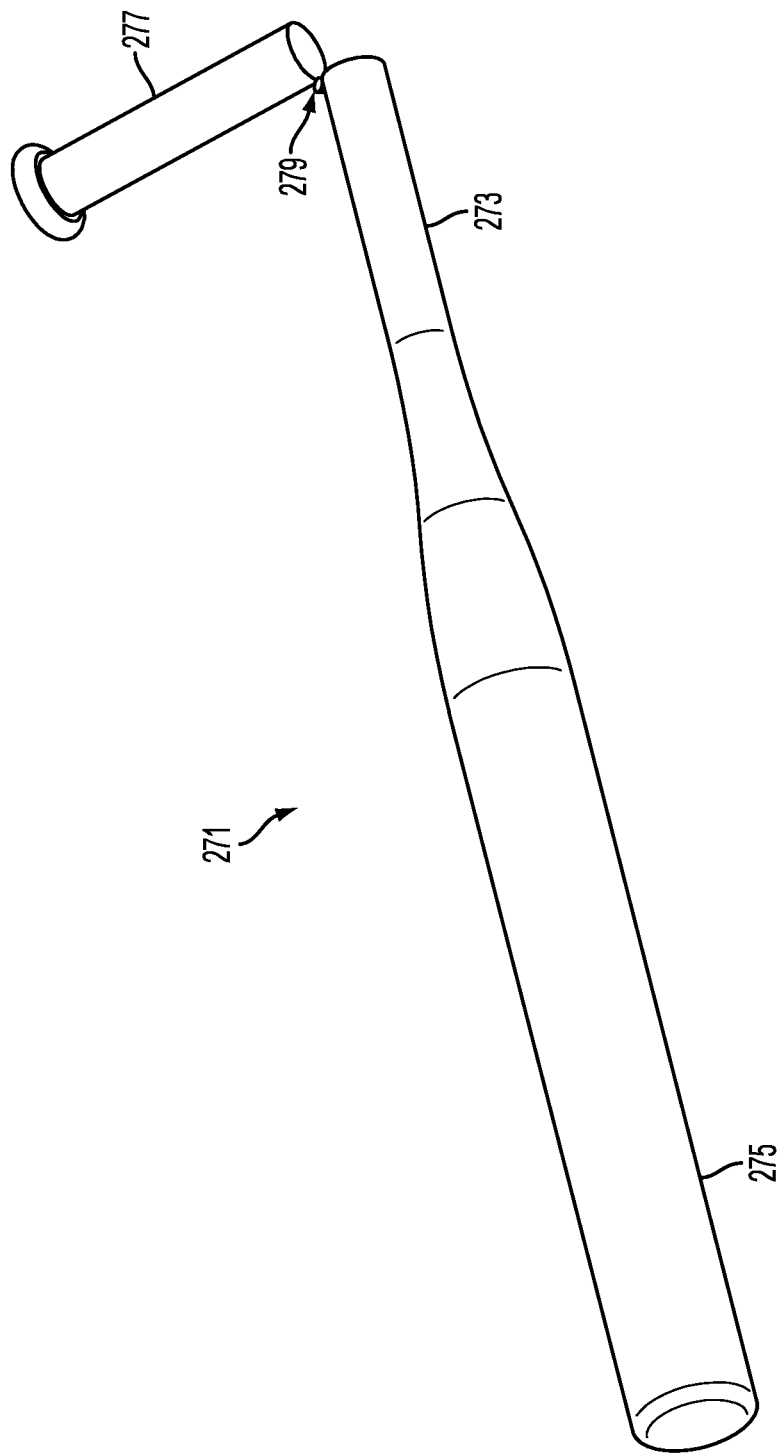
FIG. 30 is an embodiment of a multi-sport apparatus in a second configuration.

Referring now to FIG. 30, an embodiment of the multi-sport apparatus 271 is illustrated. The multi-sport apparatus 271 may generally comprise a handle portion 273 and a head portion 275. A hinged end 277 may be hingedly attached to the handle portion 273 with a hinge 279. In a first configuration, the hinged end 277 may be longitudinally aligned with the handle portion 273. In second configuration, as illustrated at FIG. 30, the hinged end 279 may be rotated relative to the handle portion 273. For example, the hinged end 279 may be rotated 90 degrees from the longitudinal axis of the handle portion 273. However, it is foreseen that the angle of rotation, for example, may be greater or less than 90 degrees.

Figure 31:
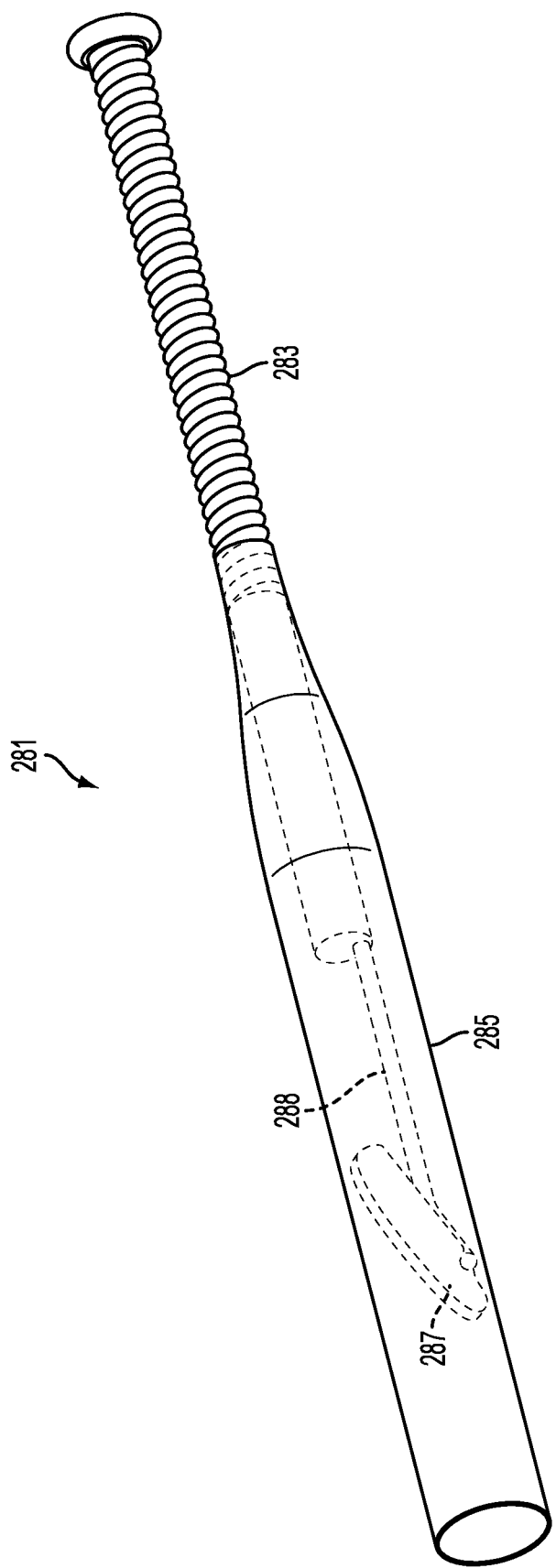
FIG. 31 is an embodiment of a multi-sport apparatus in a first configuration.
Figure 32:
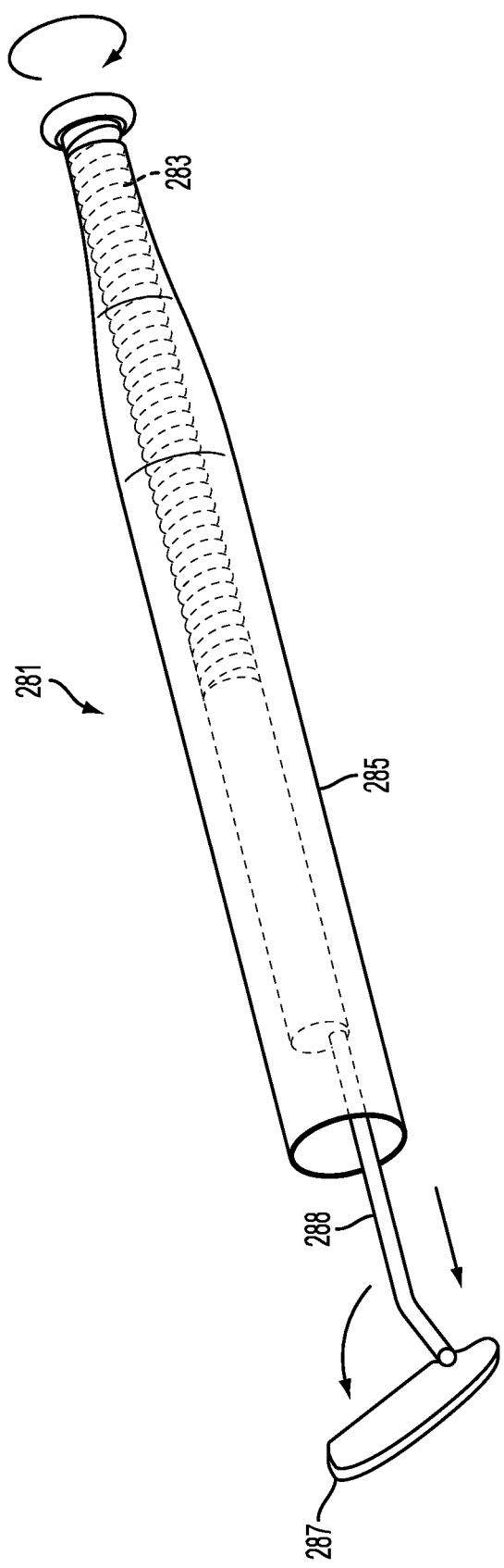
FIG. 32 is the multi-sport apparatus of FIG. 31 in a second configuration.

Referring now to FIGS. 31 and 32, an embodiment of the multi-sport apparatus 281 is illustrated. The multi-sport apparatus 281 may generally comprise a threaded handle portion 283 and a hollow head portion 285. The threaded handle portion 283 may have a club head 287 attached to an end thereof. The club head 287 may be hingedly or rotatably attached to a rod 288 extending from the end of the threaded handle portion 283. For example, the club head 287 may be spring loaded to urge the club head 287 outwardly from the rod 288. The threaded handle portion may be threadably received within the hollow head portion 285. For example, the internal side wall of head portion 285 may be threaded in order to engage the threaded handle portion 283. In a first configuration, as illustrated at FIG. 31, the threaded handle portion 283 may be at least partially unthreaded from the hollow head portion 285 such that the club head 287 may be positioned within the hollow head portion 285. In a second configuration, as illustrated at FIG. 32, the threaded handle portion 283 may be substantially or fully threaded into the hollow head portion 285 such that the club head 287 may extend outside the hollow head portion 285. When the multi-sport apparatus 281 is in the second configuration, the club head 287 may be urged to an outward rotational position, as illustrated at FIG. 32.

Figure 33:
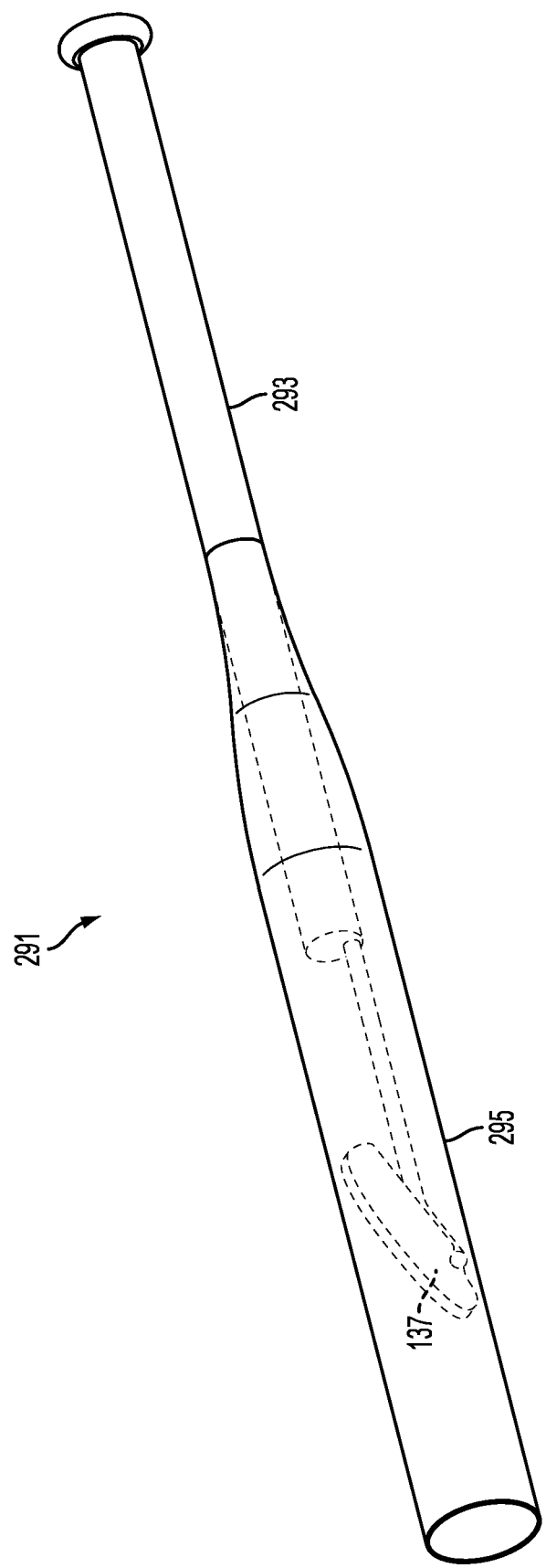
FIG. 33 is an embodiment of a multi-sport apparatus in a first configuration.
Figure 34:
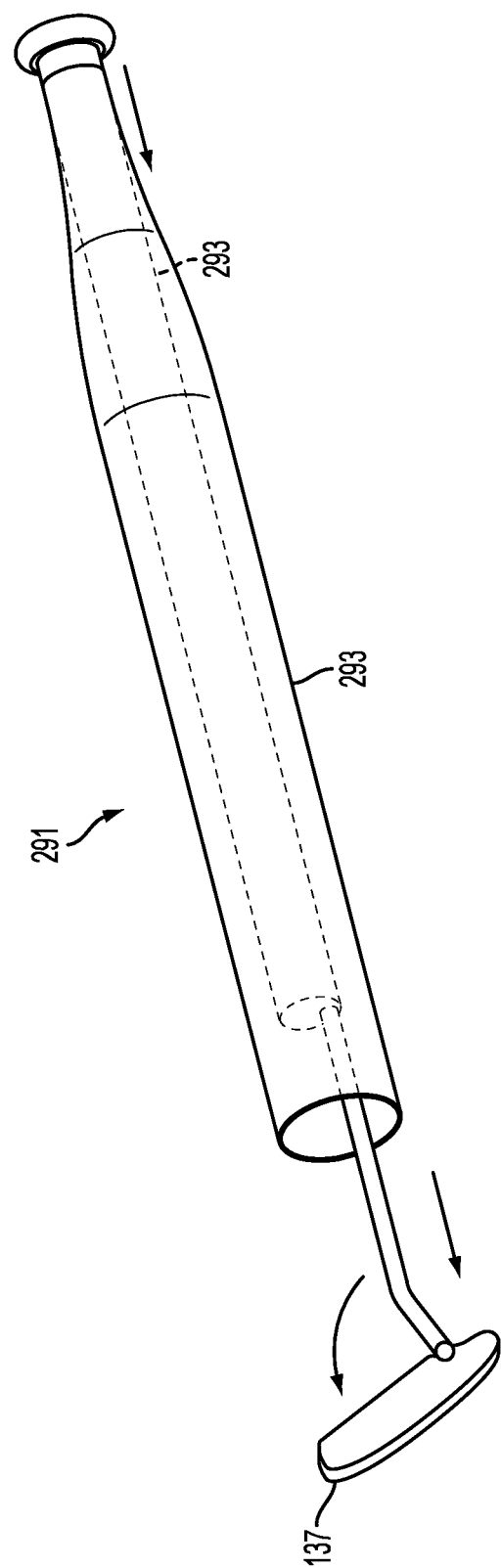
FIG. 34 is the multi-sport apparatus of FIG. 33 in a second configuration.

Referring now to FIGS. 33 and 34, an embodiment of the multi-sport apparatus 291 is illustrated. The multi-sport apparatus 291 may generally comprise a handle portion 293 and a hollow head portion 295. The handle portion 293 may have a club head 297 attached to an end thereof. The club head 297 may be hingedly or rotatably attached to a rod 298 extending from the end of the threaded handle portion 293. For example, the club head 287 may be spring loaded to urge the club head 287 outwardly from the rod 288.

According to an embodiment, the handle portion 293 may be slidably received in the hollow head portion 295. In a first configuration, as illustrated at FIG. 33, the threaded handle portion 293 may be at least partially withdrawn from the hollow head portion 295 such that the club head 297 may be positioned within the hollow head portion 295. In a second configuration, as illustrated at FIG. 34, the handle portion 293 may be substantially or fully disposed into the hollow head portion 295 such that the club head 297 may extend outside the hollow head portion 295. When the multi-sport apparatus 291 is in the second configuration, the club head 297 may be urged to an outward rotational position, as illustrated at FIG. 34. According to another embodiment, the handle portion 293 may be spring loaded such that the handle portion 293 is urged to the withdrawn position of the first configuration. When the handle portion 293 is substantially or fully disposed into the hollow head portion 295, a detent may catch the handle portion 293 to releasably fix the handle portion 293 in the disposed position of the second configuration.

It is foreseen that structure or functionality of any of the embodiments described with respect to the embodiments of the multi-sport apparatus described above may be used in any combination with each other.

Computing Device for Indicating Multiple Sports

Referring now to FIGS. 35-38, embodiments of a computing device for indicating multiple sports, such as having a software program for a multi-sport game are described. For example, the software program for the multi-sport game may be used in combination with the various embodiments of the multi-sport ball and the multi-sport apparatus described above. As described in more detail below, a user device, such as a computing device 400, may be configured to store and run the software program.

Figure 35:
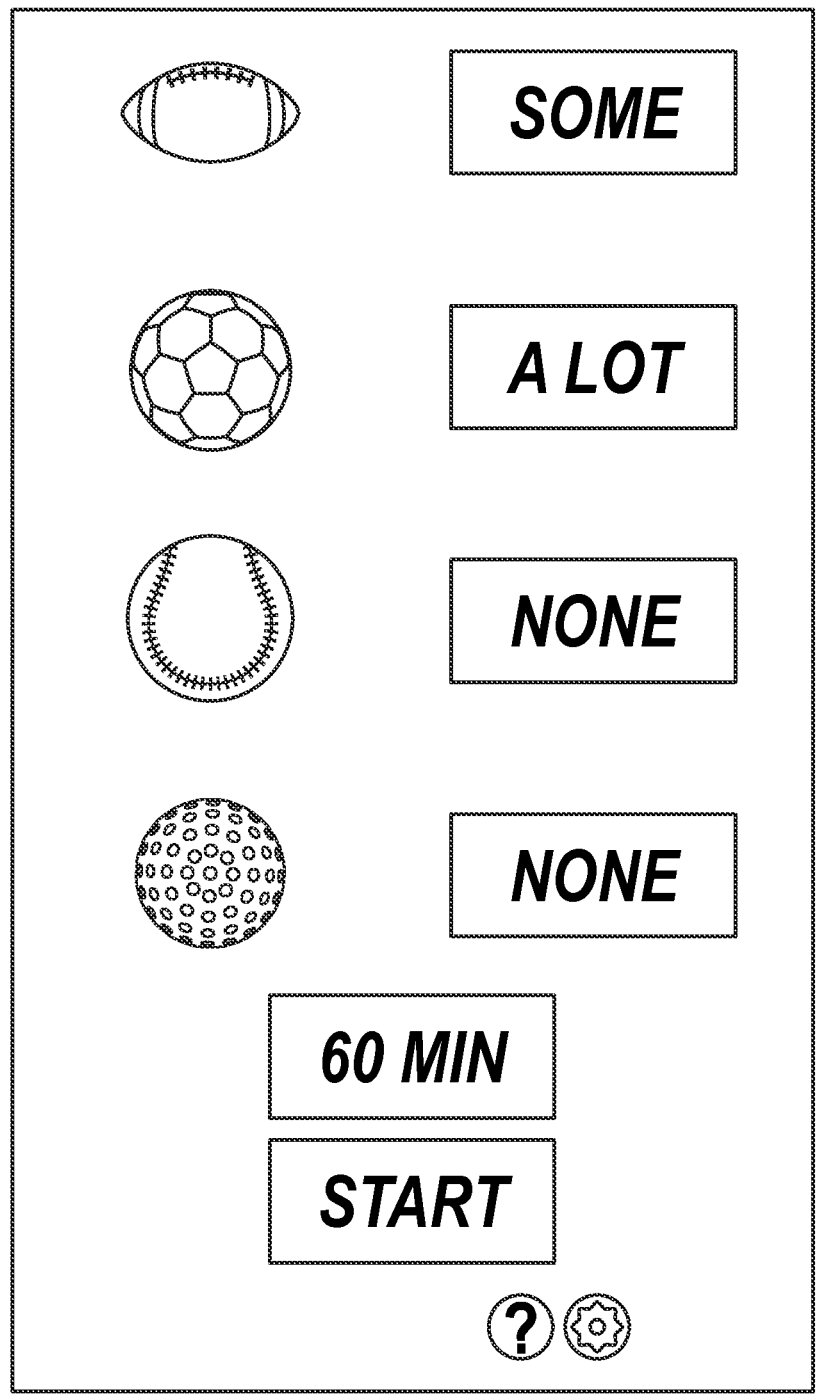
FIG. 35 is an embodiment of a game selection screen.

The software program for the multi-sport game may be loaded onto a user device and configured with limited user input in order to control types of games to be played, the duration of time each of game may be played, and the method of scoring for each game. Referring now to FIG. 35, a plurality of games may be displayed by the user device or from the user device with a desired quantity for each game on a game selection screen. For example, the screen depicted at FIG. 35 of the user device indicates that a user may select from football, soccer, baseball, and/or golf. The user may toggle the desired quantity for each game from the selections of "none," "some," and "a lot." The user may also select the total duration of game play for all the selected games. For example, the user may toggle between 5 minutes, 10 minutes, 15 minutes, 30 minutes, or 60 minutes. It is foreseen that any time duration of game play may be entered or selected.

The desired quantity for each game from the selections of "none," "some," and "a lot" may indicate a proportion of the total duration of game play for each game. An algorithm, of the software program, for example, may calculate the proportion of game play for each game depending the desired quantity selected for each game. For example, if "some" is selected for all of football, soccer, baseball, and golf, the algorithm with calculate that all games are desired to be played equally and allocated 25% of the total duration of game play to each of the four games. Similarly, if "a lot" is selected for all of football, soccer, baseball, and golf, the algorithm with calculate that all games are desired to be played equally and allocated 25% of the total duration of game play to each of the four games.

When the desired quantity selected for each game varies between "none," "some," and "a lot," the algorithm may determine that the games will be played for proportionally different durations of the total game play. For example, if the desired quantity of football to be played is "a lot" and the desired quantity of soccer, baseball, and golf to be played is "some," the algorithm will determine that the proportion of total game play allocated to football will be more than the proportion of total game play allocated to each of soccer, baseball, and golf.

For illustrative purposes, Table 1 is provided as an example of allocation of total game play depending on the selected desired quantity.

TABLE 1

|  | Game | Desired Quantity | Proportion of Total Game Play |
| --- | --- | --- | --- |
| Example 1 | Football | A lot | 60.00% |
|  | Soccer | Some | 13.30% |
|  | Baseball | Some | 13.30% |
|  | Golf | Some | 13.30% |
| Example 2 | Football | A lot | 33.33% |
|  | Soccer | A lot | 33.33% |
|  | Baseball | Some | 16.67% |
|  | Golf | Some | 16.67% |
| Example 3 | Football | A lot | 28.50% |
|  | Soccer | A lot | 28.50% |
|  | Baseball | A lot | 28.50% |
|  | Golf | Some | 14.17% |

As another example, if "none" of a particular game is selected, the algorithm will determine that none of the total duration of game play will be allocated to the particular game. In such an example, the proportion of total game play of the other games are adjusted accordingly so that 100% of total duration of game play is allocated to the games selected with a desired quantity of "some" or "a lot."

As explained in further detail below, the duration of time allocated to each game by the user device may be calculated by the proportion of total game play for each game and the selected total duration of game play. A timer function may be set according to the calculated duration of time allocated to each game. For example, a separate countdown may be assigned to the calculated duration of time allocated to each game.

Referring now to FIG. 36, the user may optionally modify the points awarded for a score in each of the games on a point selection screen. For example, a user may determine that a score in baseball is worth more points than a score in golf. Accordingly, as illustrate at FIG. 36, a user may award 4-points to a score in baseball and 1-point to a score in golf. It is foreseen that the points awarded for a score in any game may range from 1-point to 4-points or more.

The user may also indicate that games longer than a selected duration should be "split" for the purposes of the timer function. For example, if the algorithm determines that a particular game duration is 18-minutes and the user selects that games longer than 10-minutes should be split, the algorithm may split the game into two different timed segments of 9-minutes each. According to an embodiment, with respect to the timer function, a separate countdown may be assigned to the calculated duration of time allocated to each game segment.

Figure 37:
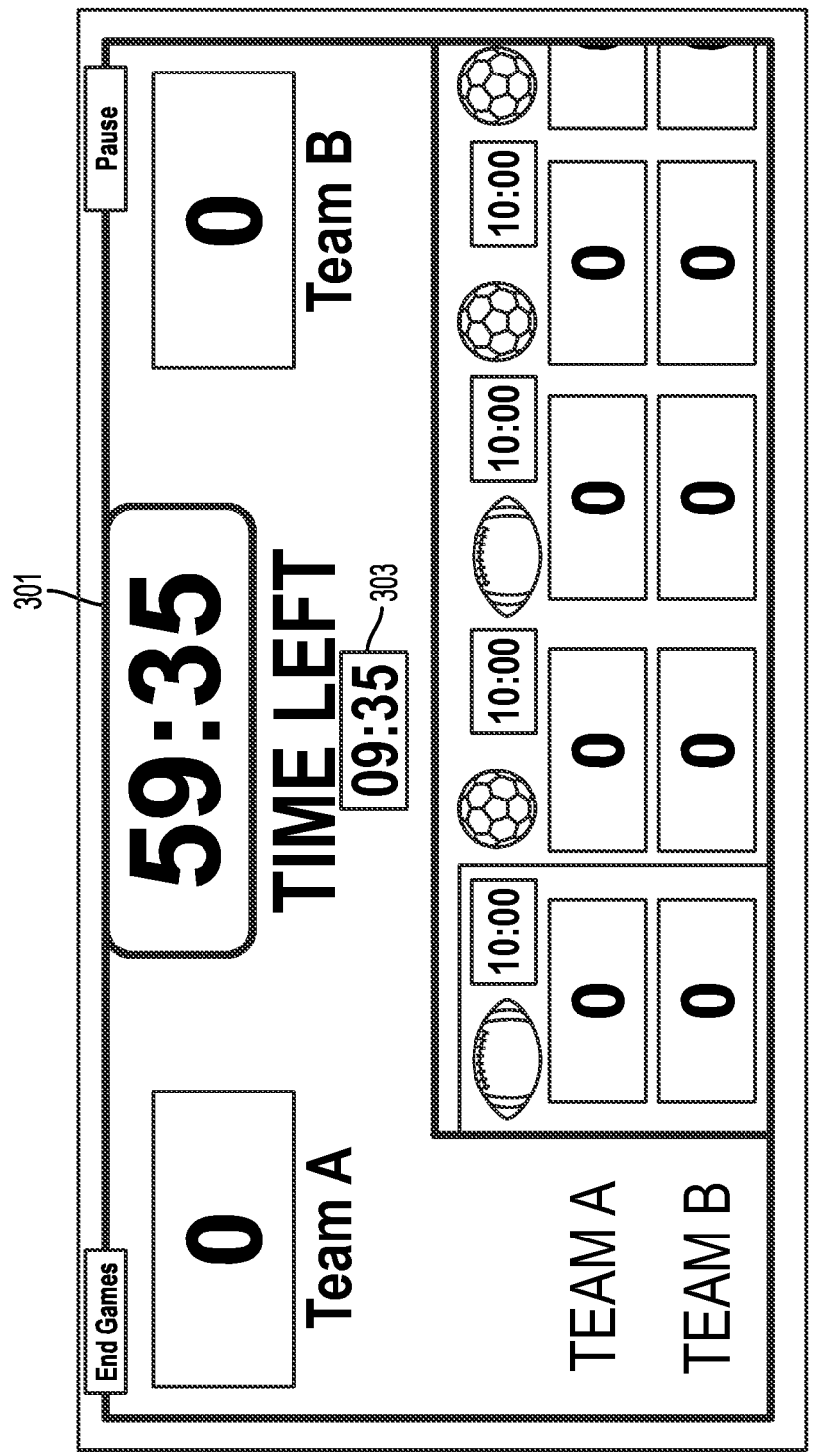
FIG. 37 is an embodiment of a game play screen.

Referring now to FIG. 37, an embodiment of a game-play screen is illustrated. The game-play screen generally directs the users as to what type of game to play and the duration each game may be played. Additionally, the game-play screen may track the scores for each team during each game, and award points depending on the number of points awarded for each score in the respective games. The game-play screen may comprise a total game play duration time 301 and an individual game timer 303. The game-play screen may also indicate the game or game segment to be played along with the allocated time duration allocated to each game or game segment.

According to an embodiment, if 3-points are assigned to a touchdown in football and 2-points are assigned to a goal in soccer, the score may be calculated accordingly. For example, if Team A scores 1 touchdown in football and no goals in soccer, a total score of 3-points will be assigned to Team A. If Team B scores 1 touchdown in football and 1 goal in soccer, a total score of 5-points will be assigned to Team B. In such a manner, one score may be equal to a point total which may be determined by the user.

According to an embodiment, the user device may be configured to alert the user when each timer countdown begins and ends. The user device may be further configured to alert the user as to which game each timer is assigned to when each timer countdown begins. It is foreseen that the user device may be configured to randomize the games to be played as well as the time allocated to each game. It is foreseen that the user device may have a speaker or other audible alert. The user device may be configured to audibly alert the user or users when the time has expired for a particular segment or game. It is foreseen that the user device may be further configured to audibly alert the user or users when a new segment or game begins and also what game has been allocated for the segment.

The one or more user devices, may be any type of computing device, including a mobile telephone, a laptop, tablet, or desktop computer having, for example, a processor, a netbook, a video game device, a pager, a smart phone, an ultra-mobile personal computer (UMPC), or a personal data assistant (PDA). The one or more user devices may run one or more applications, such as Internet browsers, voice calls, video games, videoconferencing, and email, among others. The one or more user devices may be any combination of computing devices.

Figure 38:
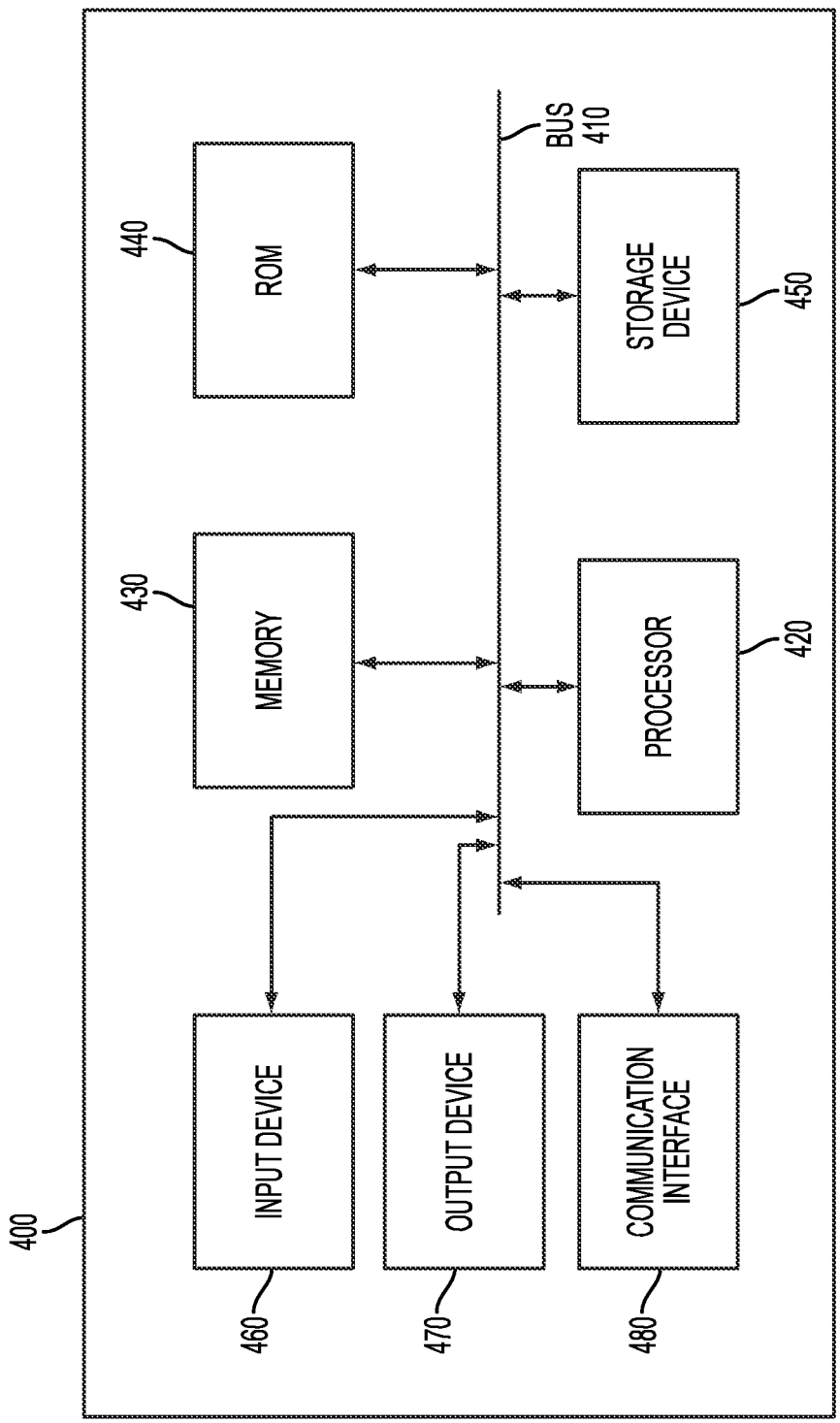
FIG. 38 is an exemplary embodiment of a computing device.

FIG. 38 depicts an exemplary architecture for implementing the computing device 400 in accordance with one or more embodiments, which may be used to implement any of the computing devices discussed herein, or any other computer system or computing device component thereof. It will be appreciated that other devices that can be used with the computing device 400, such as a client or a server, may be similarly configured. As illustrated in FIG. 38, computing device 400 may include a bus 410, a processor 420, a memory 430, a read only memory (ROM) 440, a storage device 450, an input device 460, an output device 470, and a communication interface 480.

Bus 410 may include one or more interconnects that permit communication among the components of computing device 400. Processor 420 may include any type of processor, microprocessor, or processing logic that may interpret and execute instructions (e.g., a field programmable gate array (FPGA)). Processor 420 may include a single device (e.g., a single core) and/or a group of devices (e.g., multi-core). Memory 430 may include a random access memory (RAM) or another type of dynamic storage device that may store information and instructions for execution by processor 420. Memory 430 may also be used to store temporary variables or other intermediate information during execution of instructions by processor 420.

ROM 440 may include a ROM device and/or another type of static storage device that may store static information and instructions for processor 420. Storage device 450 may include a magnetic disk and/or optical disk and its corresponding drive for storing information and/or instructions. Storage device 450 may include a single storage device or multiple storage devices, such as multiple storage devices operating in parallel. Moreover, storage device 450 may reside locally on the computing device 400 and/or may be remote with respect to a server and connected thereto via network and/or another type of connection, such as a dedicated link or channel.

Input device 460 may include any mechanism or combination of mechanisms that permit an operator to input information to computing device 400, such as a keyboard, a mouse, a touch sensitive display device, a microphone, a pen-based pointing device, and/or a biometric input device, such as a voice recognition device and/or a finger print scanning device. Output device 470 may include any mechanism or combination of mechanisms that outputs information to the operator, including a display, a printer, a speaker, etc.

Communication interface 480 may include any transceiver-like mechanism that enables computing device 400 to communicate with other devices and/or systems, such as a client, a server, a license manager, a vendor, etc. For example, communication interface 480 may include one or more interfaces, such as a first interface coupled to a network and/or a second interface coupled to a license manager. Alternatively, communication interface 480 may include other mechanisms (e.g., a wireless interface) for communicating via a network, such as a wireless network. In one implementation, communication interface 480 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 400 may perform certain functions in response to processor 420 executing software instructions contained in a computer-readable medium, such as memory 430. In alternative embodiments, hardwired circuitry may be used in place of or in combination with software instructions to implement features consistent with principles of the disclosure. Thus, implementations consistent with principles of the disclosure are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in an embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

I claim:

1. A multi-sport ball, comprising:
an outer ball having an outer ball first side and an outer ball second side, wherein the outer ball forms an intermediate compartment therein;
the outer ball first side and the outer ball second side each having a mating face each said mating face positioned between an edge of said intermediate compartment and a respective circumferential edge of each of said outer ball first side and said outer ball second side, wherein the outer ball first side and the outer ball second side are configured to be separated at the mating faces;
an intermediate ball having a different shape than the outer ball, said intermediate compartment configured to receive said intermediate ball;
a circumferential compartment formed between said mating faces, said circumferential compartment defined by an annular recess depending into at least a respective one said mating face of said outer ball first side or said outer ball second side;
said annular recess extending a width between an inner edge surrounding a portion of said intermediate compartment formed into said respective one said mating face, and an outer edge of said annular recess positioned adjacent an annular outer portion of said respective one said mating face adjacent said circumferential edge thereof;
said annular recess depending a depth to dimension said circumferential compartment to a size adapted to receive a flying disc therein.

2. The multi-sport ball of claim 1, further comprising a flying disc, positioned in said intermediate compartment configured to receive the disc therein.

3. The multi-sport ball of claim 2, wherein the mating faces of the outer ball first side and the outer ball second side are circumferential mating faces.

4. The multi-sport ball of claim 1, wherein at least one of the outer ball first side and the outer ball second side further comprise a fastener configured to fasten the outer ball first side and the outer ball second side.

5. The multi-sport ball of claim 4, wherein the fastener comprises at least one of a quarter-turn fastener, a threaded connector, a magnet, and a hook-and-loop fastener.

6. The multi-sport ball of claim 5, wherein at least one of the outer ball first side and the outer ball second side further comprise a fastener configured to fasten the outer ball first side and the outer ball second side.

7. The multi-sport ball of claim 1, further comprising a chamber at least partially lining the intermediate compartment.

8. The multi-sport ball of claim 7, wherein the chamber is relatively more rigid than a material of the outer ball.

9. The multi-sport ball of claim 7, wherein each of the outer ball first side and the outer ball second side form at least part of the intermediate compartment, wherein the chamber at least partially lines at least part of the intermediate compartment of each of the outer ball first side and the outer ball second side.

10. The multi-sport ball of claim 9, wherein the chamber is configured to fasten the outer ball first side to the outer ball second side.

11. The multi-sport ball of claim 10, wherein the chamber is configured to be separated into a chamber of the outer ball first side and a chamber of the outer ball second side.

12. The multi-sport ball of claim 11, wherein the chamber of the outer ball first side is configured to be fastened to the chamber of the outer ball second side.

13. The multi-sport ball of claim 1, wherein the intermediate ball further comprises an intermediate ball first side and an intermediate ball second side, wherein the intermediate ball first side and the intermediate ball second side are configured to be separated at the mating faces.

14. The multi-sport ball of claim 13, wherein the intermediate ball forms an inner compartment therein.

15. The multi-sport ball of claim 14, further comprising an inner ball having a different shape than the intermediate ball, wherein the inner compartment is configured to receive the inner ball.

* * * * *